(12) United States Patent
Amiri

(10) Patent No.: US 8,774,878 B2
(45) Date of Patent: Jul. 8, 2014

(54) ULTRA MOBILE COMMUNICATING COMPUTER WITH FINGER HOLES TO EASE GRIP

(76) Inventor: Ahmad Amiri, Richmond Hill (CA)

( * ) Notice: Subject to any disclaimer, the term of this patent is extended or adjusted under 35 U.S.C. 154(b) by 1504 days.

(21) Appl. No.: 11/722,500

(22) PCT Filed: Feb. 6, 2006

(86) PCT No.: PCT/CA2006/000237
§ 371 (c)(1),
(2), (4) Date: Jun. 21, 2007

(87) PCT Pub. No.: WO2006/081692
PCT Pub. Date: Aug. 10, 2006

(65) Prior Publication Data
US 2011/0009164 A1   Jan. 13, 2011

Related U.S. Application Data

(60) Provisional application No. 60/650,130, filed on Feb. 7, 2005, provisional application No. 60/677,326, filed on May 4, 2005.

(51) Int. Cl.
*H04M 1/00* (2006.01)
*H04M 9/00* (2006.01)
*G06F 1/16* (2006.01)

(52) U.S. Cl.
CPC .............. *G06F 1/1615* (2013.01); *G06F 1/163* (2013.01); *G06F 1/1654* (2013.01); *G06F 1/1616* (2013.01)
USPC .............. 455/575.3; 379/433.01; 379/433.11; 379/433.13

(58) Field of Classification Search
CPC ....... G06F 1/1616; G06F 1/166; G06F 1/181; G06F 1/1656; H04M 1/0214; H04M 1/23; H04M 1/02147; H04M 1/0237; H04M 1/0216; H04M 1/0245; H04M 2250/16; H04B 1/3833; H04B 1/385; H04B 1/38; F16M 13/00
USPC ............ 455/575.1, 575.3; 379/428.01, 428.1, 379/428.13, 434
See application file for complete search history.

(56) References Cited

U.S. PATENT DOCUMENTS

| | | | |
|---|---|---|---|
| 5,782,516 A * | 7/1998 | Partida | 294/25 |
| 5,907,615 A * | 5/1999 | Kaschke | 379/433.12 |
| 5,933,772 A * | 8/1999 | Wolff | 455/351 |
| 6,164,853 A * | 12/2000 | Foote | 400/489 |
| 6,297,808 B1 * | 10/2001 | Yang | 345/167 |
| 6,311,077 B1 * | 10/2001 | Bien | 455/566 |
| 6,324,386 B1 * | 11/2001 | Headon | 455/575.3 |
| 6,466,667 B2 * | 10/2002 | Kaschke | 379/433.13 |
| 6,636,420 B2 * | 10/2003 | Nakano et al. | 361/679.27 |
| 6,731,959 B1 * | 5/2004 | Kumagai et al. | 455/575.3 |

(Continued)

*Primary Examiner* — Wesley Kim

(57) ABSTRACT

An Ultra Mobile Communicating Computer, that can have all of the features and capabilities of a smart phone and pocket computer combined and more, plus many other features such as hands free carrying, one-hand and desk free, walk & type, ready to use operation, a fast, multi finger, one or two hand keyboard with full set of large, soft touch keys, large bi-directional screen, photo cell pads and others, and that can be made disintegrable, reconfigurable, custom made, in particular to be a talking machine for speech challenged, an car for deaf, a crime prevention device, computer remote control, translator, musical instrument and multi party game gadget, in addition to a thin earpiece, an ear borne music player, video player, radio and or TV.

6 Claims, 33 Drawing Sheets

(56) References Cited

U.S. PATENT DOCUMENTS

| | | | |
|---|---|---|---|
| 6,961,593 B1 * | 11/2005 | Lonka et al. | 455/573 |
| 7,085,596 B2 * | 8/2006 | Yu et al. | 455/575.1 |
| 7,099,708 B2 * | 8/2006 | Ronkko | 455/575.1 |
| 7,286,803 B2 * | 10/2007 | Hamasaki et al. | 455/90.3 |
| 7,366,550 B2 * | 4/2008 | Wang et al. | 455/575.1 |
| 7,400,902 B2 * | 7/2008 | Jeon | 455/550.1 |
| 7,433,721 B2 * | 10/2008 | Kuroda | 455/575.3 |
| D580,710 S * | 11/2008 | Huggins | D7/515 |
| 7,492,891 B2 * | 2/2009 | Eldon | 379/433.12 |
| 7,509,151 B1 * | 3/2009 | Edwards | 455/575.1 |
| D651,205 S * | 12/2011 | Soekoro | D14/250 |
| 2002/0006809 A1 * | 1/2002 | Kubo et al. | 455/550 |
| 2004/0121798 A1 * | 6/2004 | Hamasaki et al. | 455/550.1 |
| 2004/0160511 A1 * | 8/2004 | Boesen | 348/14.02 |
| 2004/0203501 A1 * | 10/2004 | Johnson et al. | 455/90.3 |
| 2004/0259593 A1 * | 12/2004 | Wang et al. | 455/556.1 |
| 2005/0020323 A1 * | 1/2005 | Kim | 455/575.1 |
| 2005/0085273 A1 * | 4/2005 | Khalid et al. | 455/566 |
| 2005/0136999 A1 * | 6/2005 | Jeon | 455/575.3 |
| 2005/0250562 A1 * | 11/2005 | Carroll | 455/575.3 |
| 2006/0148543 A1 * | 7/2006 | Hunt | 455/575.4 |
| 2007/0021153 A1 * | 1/2007 | Novak | 455/566 |

* cited by examiner

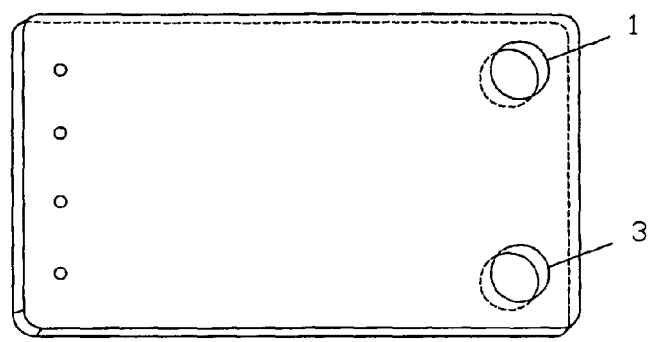
Fig. 2-A
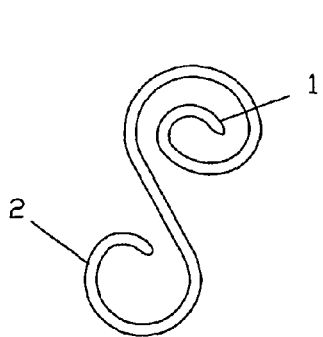
Fig. 2-B
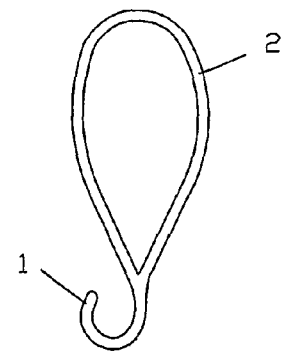
Fig. 2-C
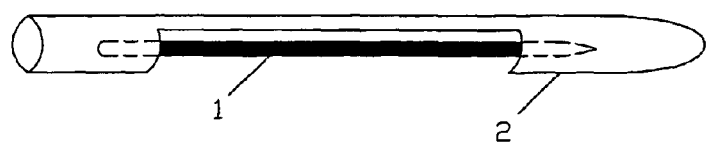
Fig. 2-D

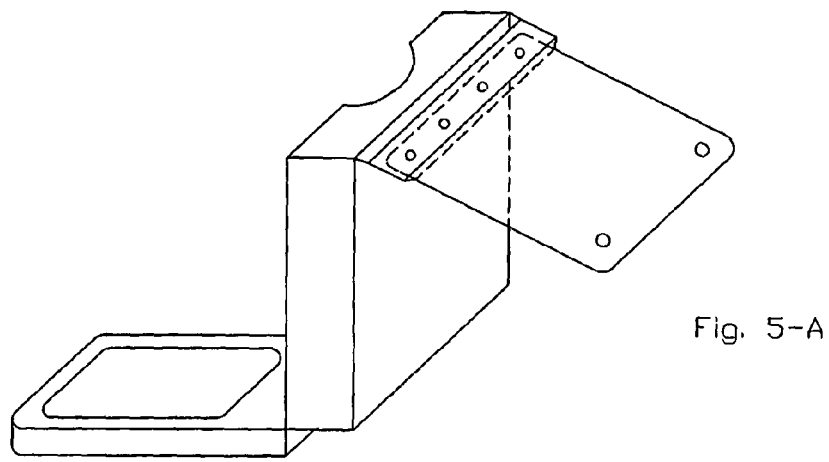
Fig. 5-A
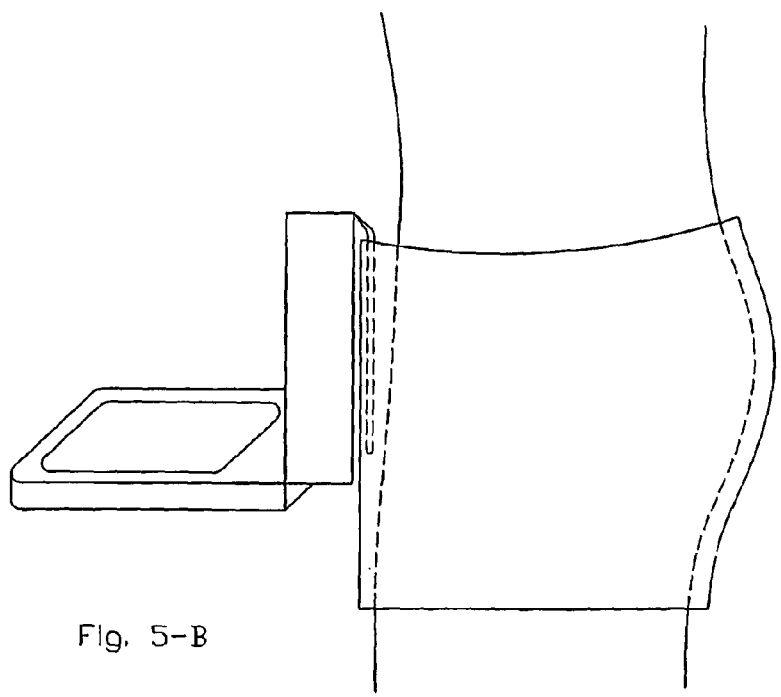
Fig. 5-B

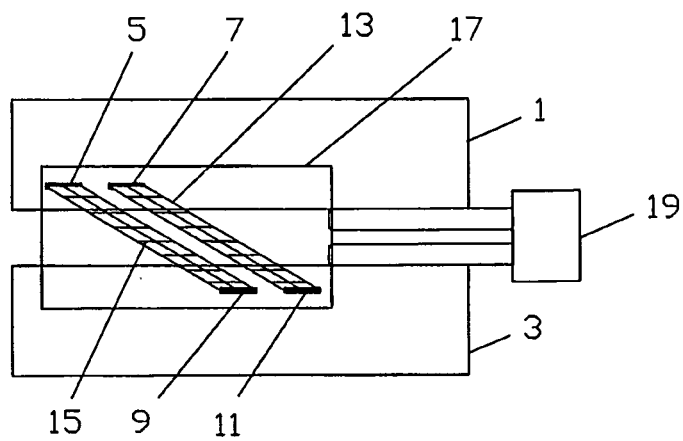
Fig. 12-A
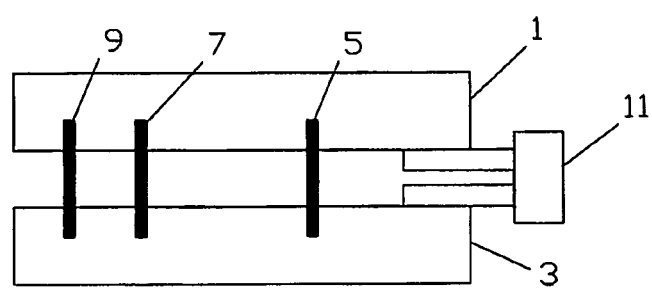
Fig. 12-B
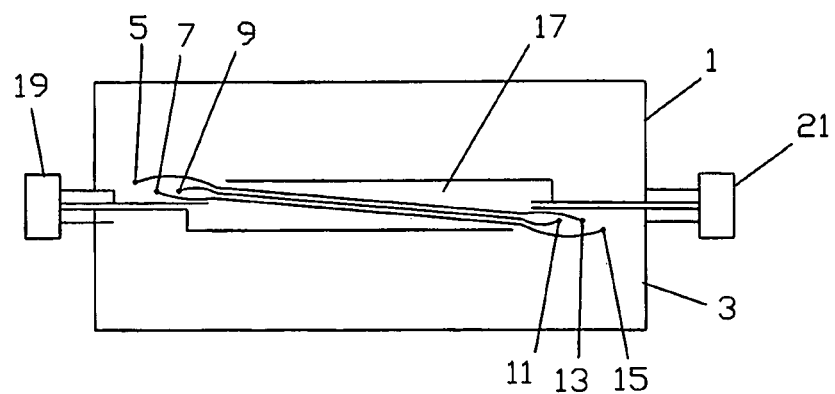
Fig. 12-C

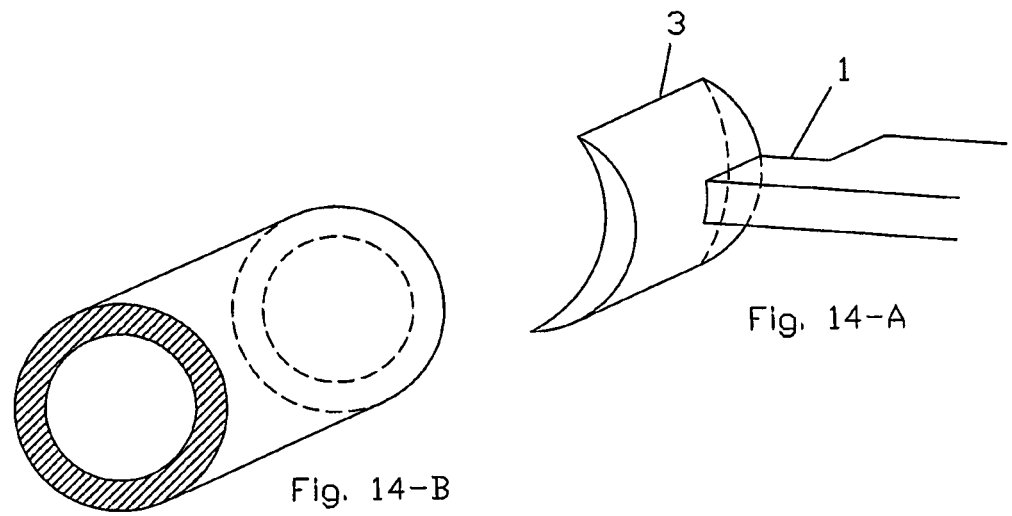
Fig. 14-A
Fig. 14-B
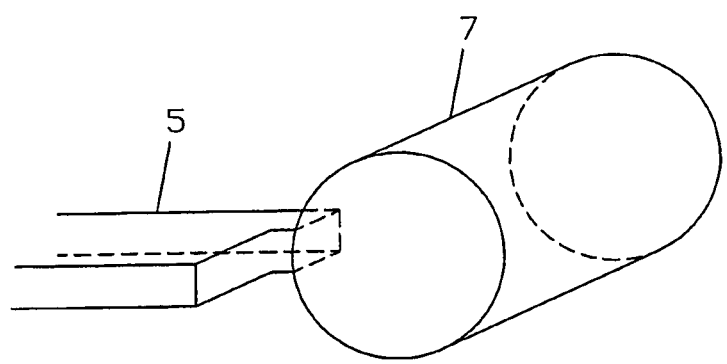
Fig. 14-C
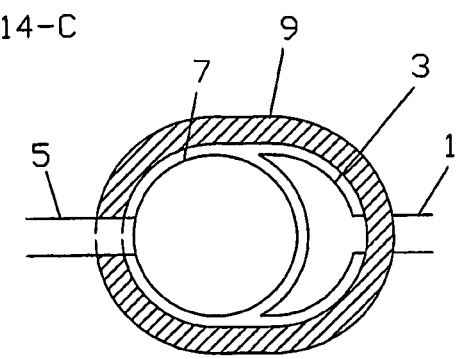
Fig. 14-D

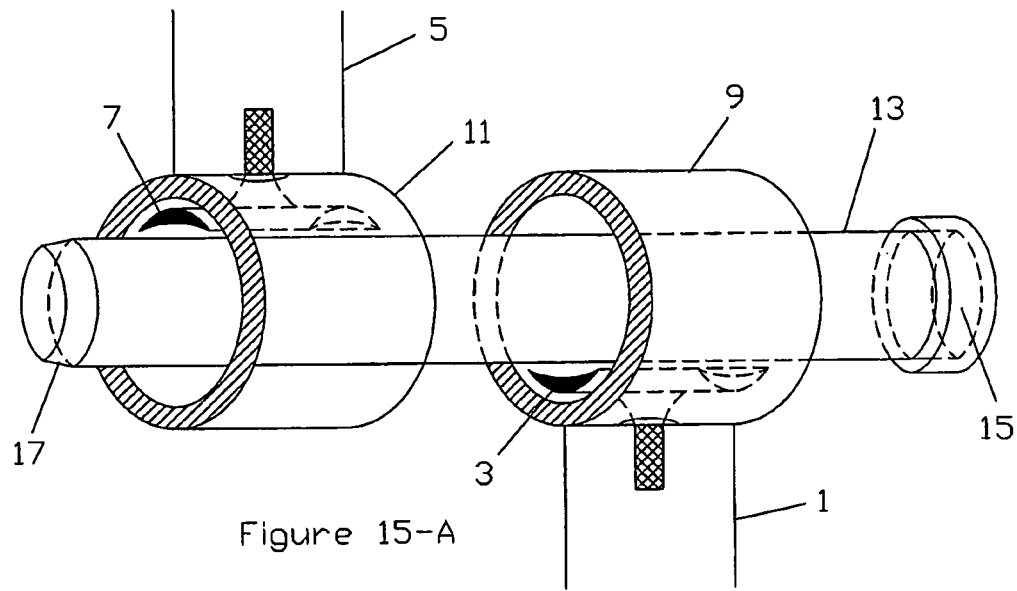
Figure 15-A
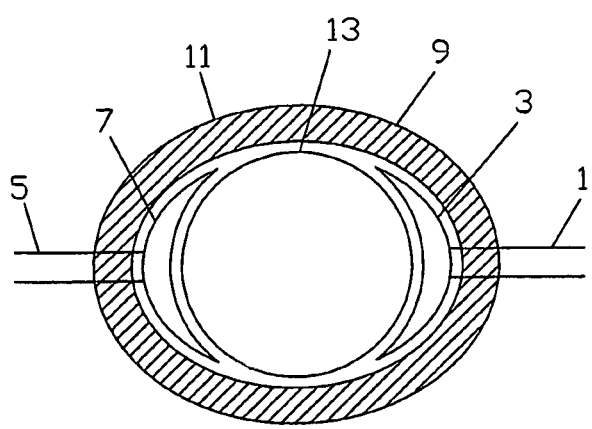
Figure 15-B

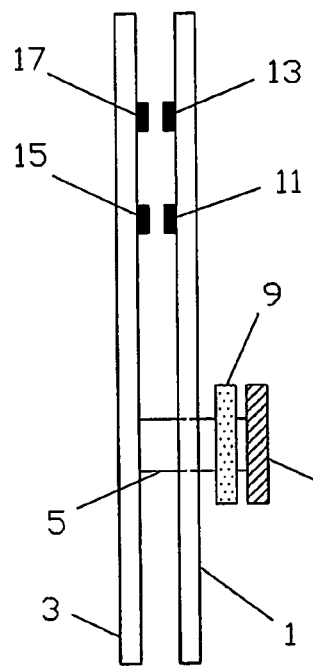
Fig. 18-A
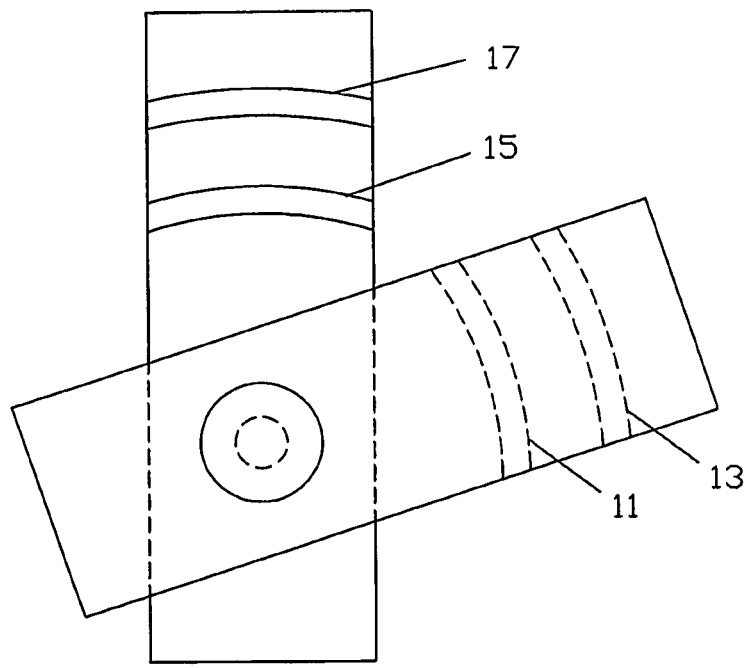
Fig. 18-B

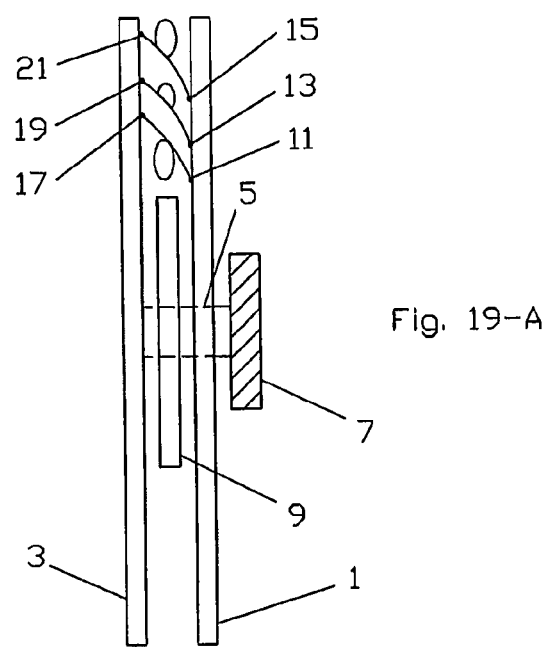
Fig. 19-A
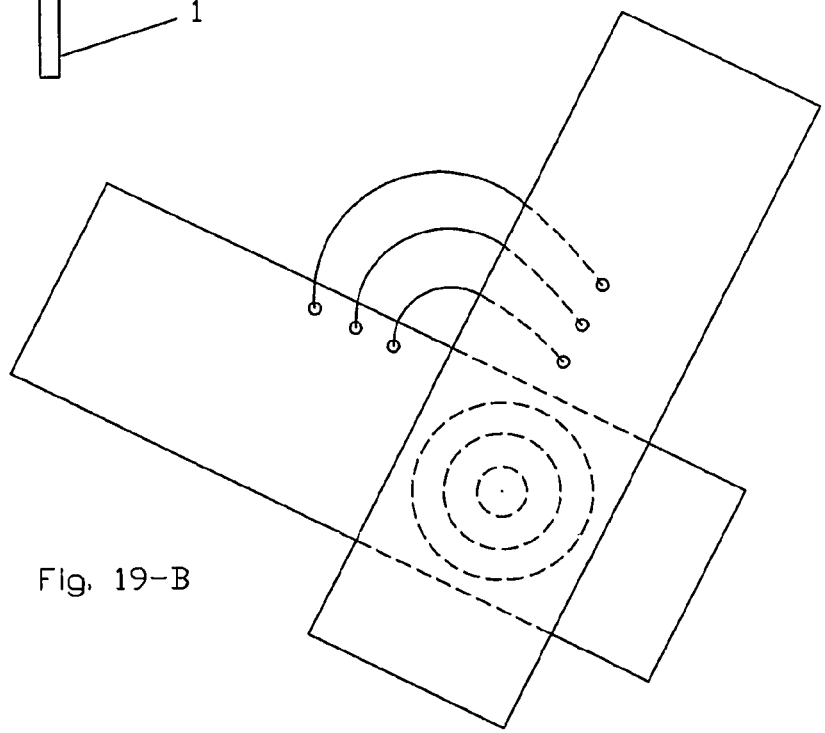
Fig. 19-B

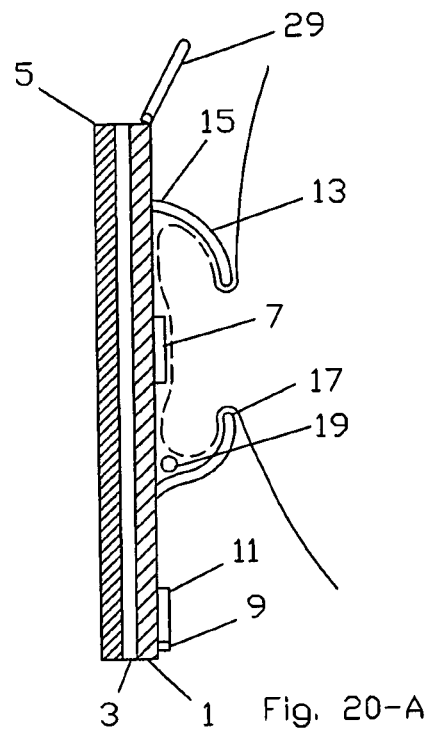
Fig. 20-A
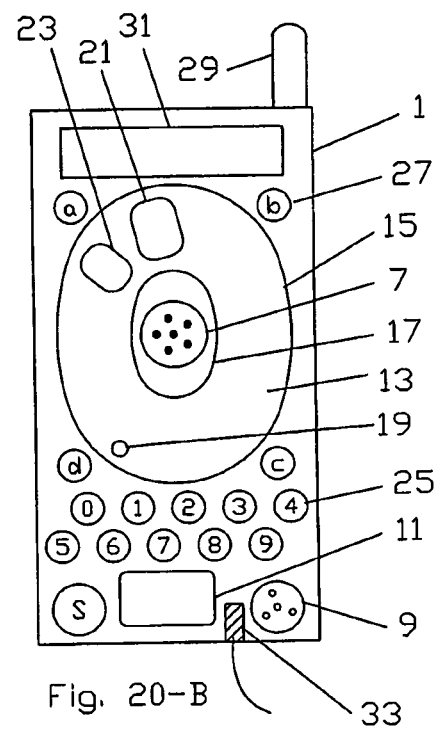
Fig. 20-B
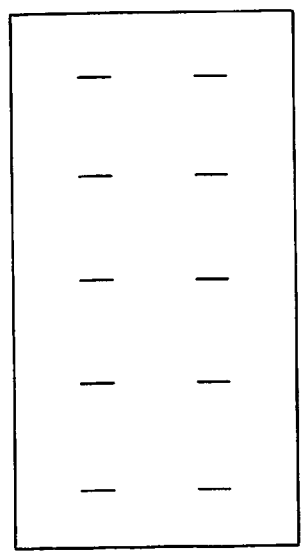
Fig. 20-C
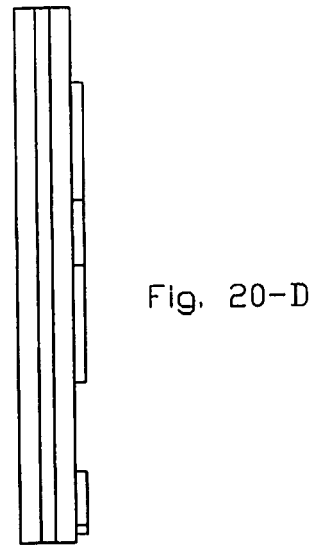
Fig. 20-D

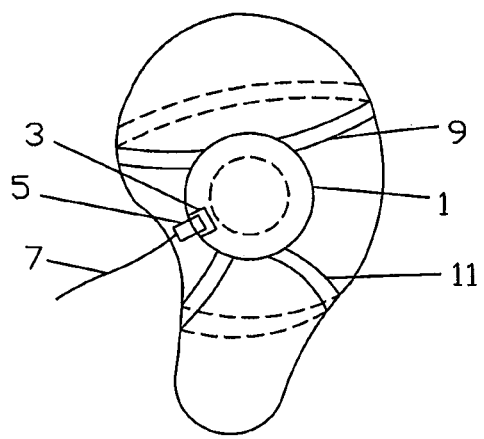
Fig. 21-A
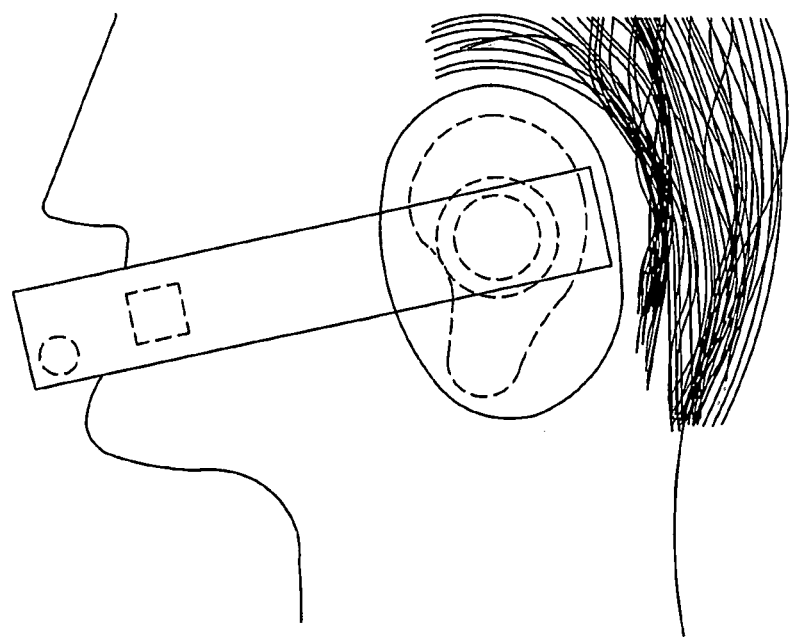
Fig. 21-B

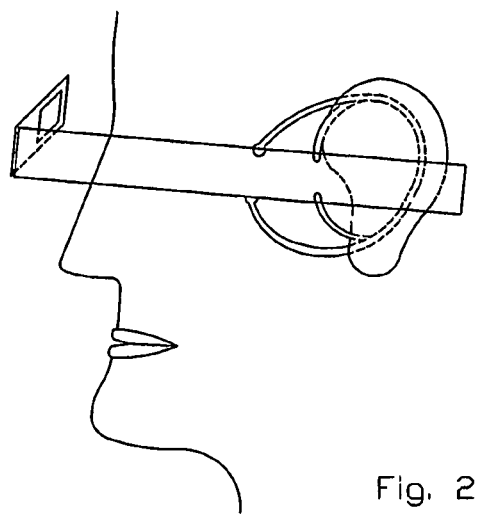
Fig. 23-A
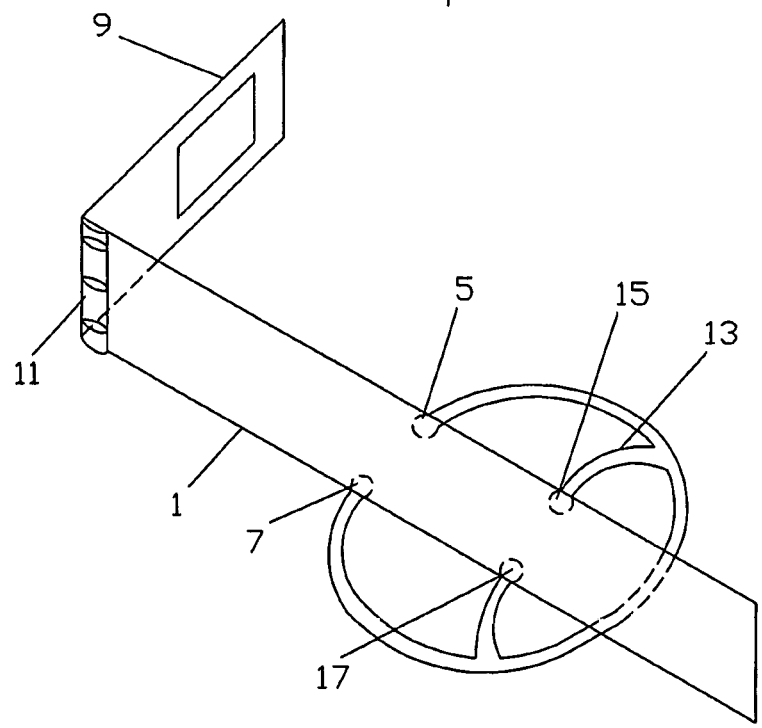
Fig. 23-B

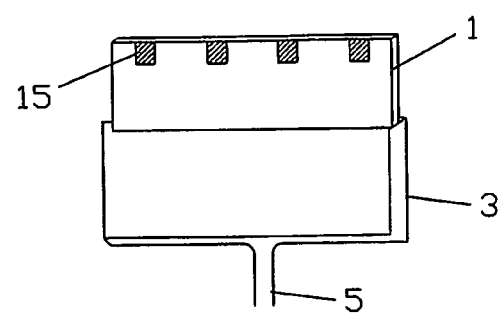
Fig. 25-A
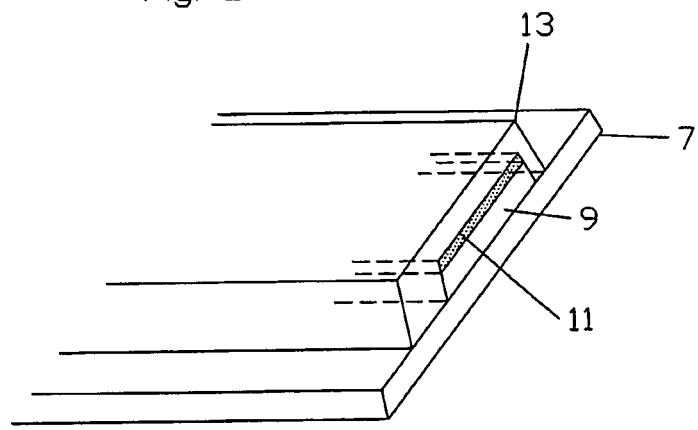
Fig. 25-B
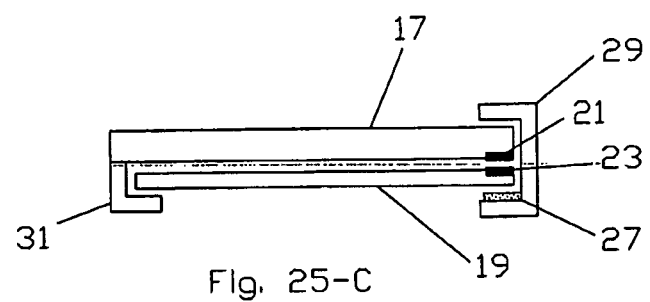
Fig. 25-C

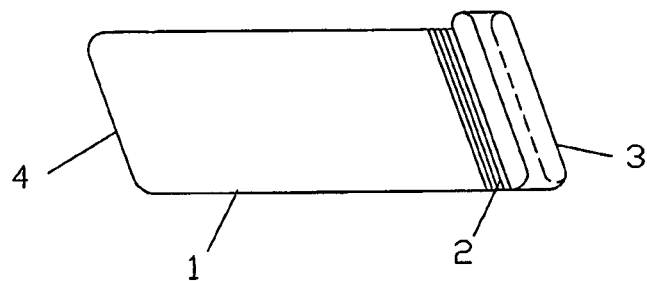
Fig. 28-A
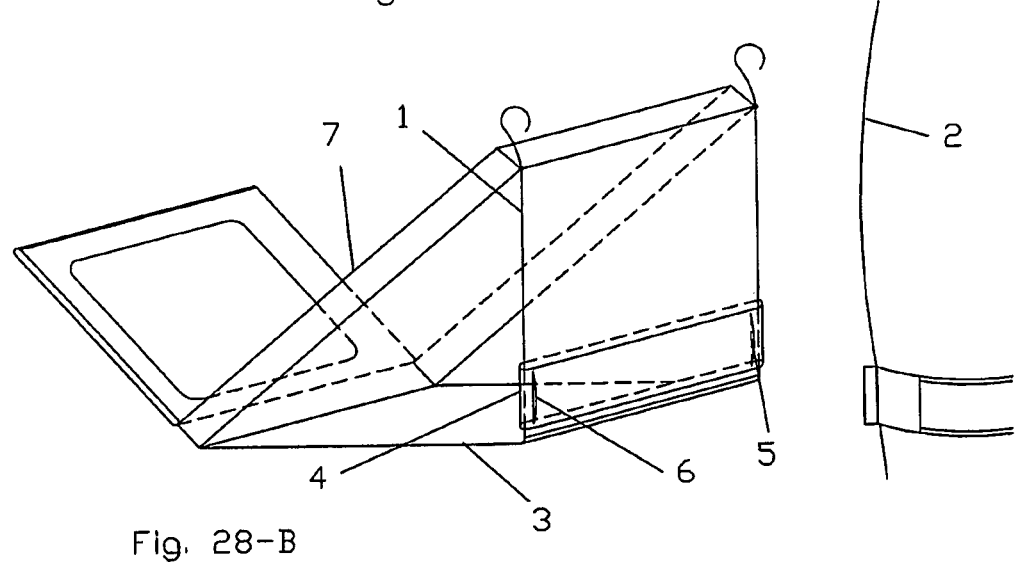
Fig. 28-B
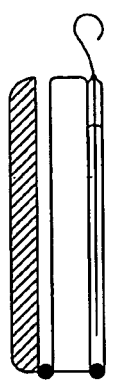
Fig. 28-C

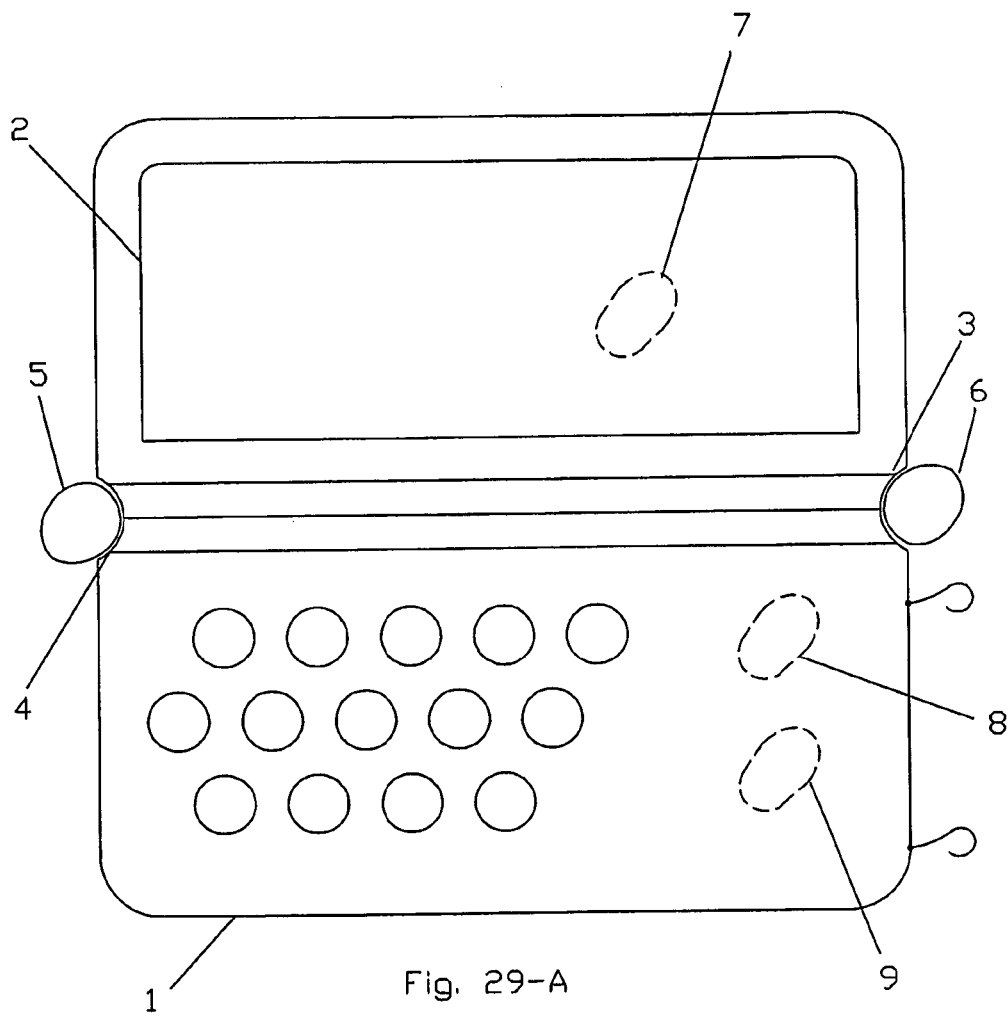
Fig. 29-A
Fig. 29-B
Fig. 29-C

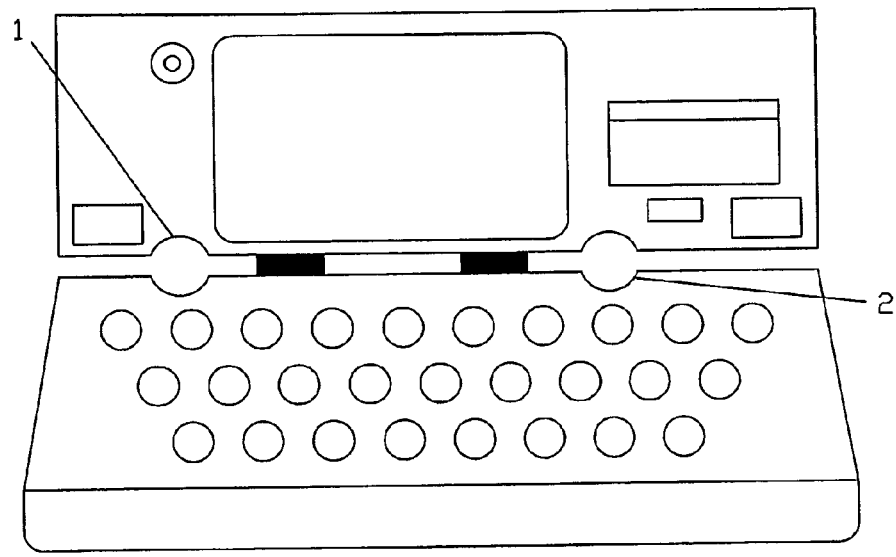
Fig. 30-A
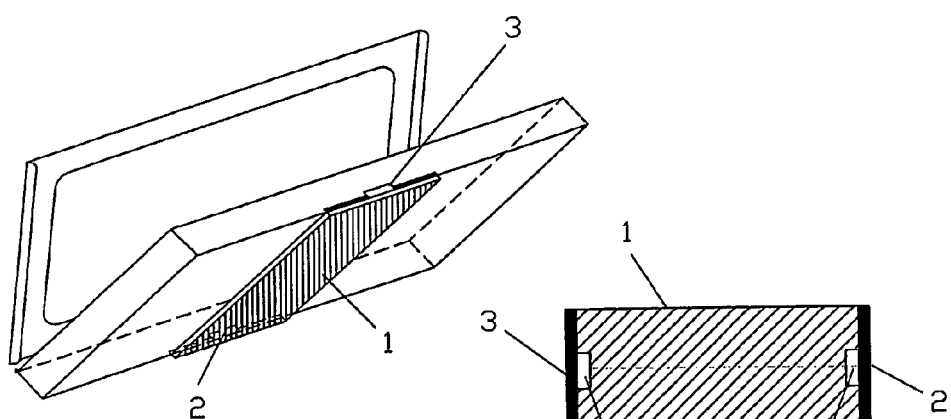
Fig. 30-B
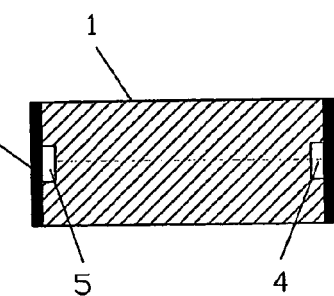
Fig. 30-C

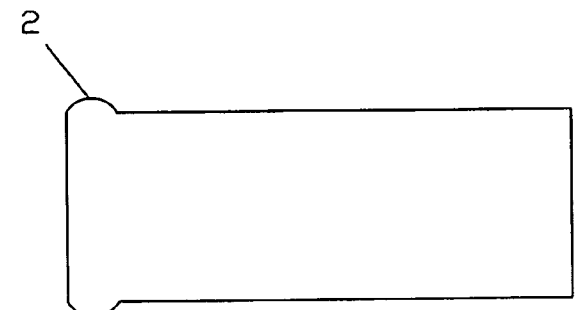
Fig. 31-A
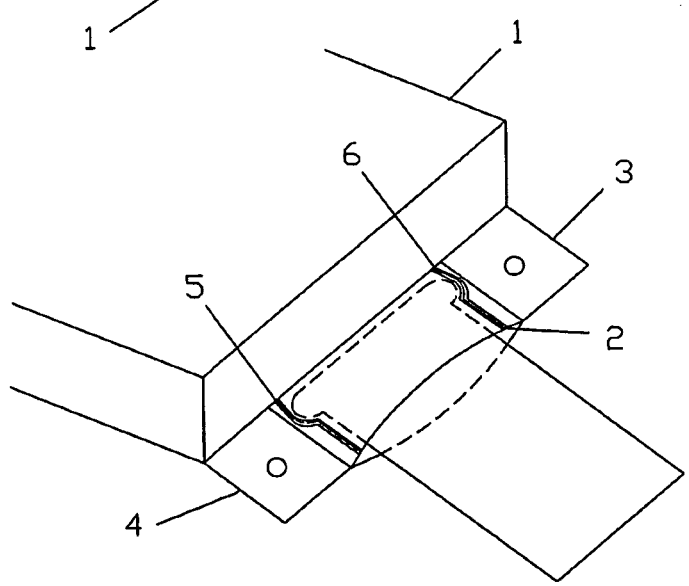
Fig. 31-B
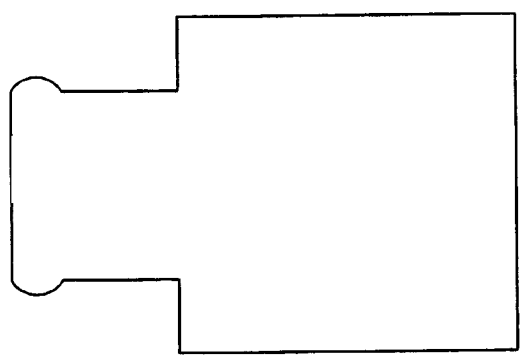
Fig. 31-C

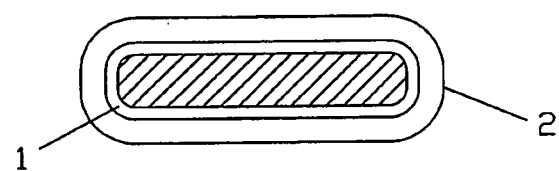
Fig. 32-A
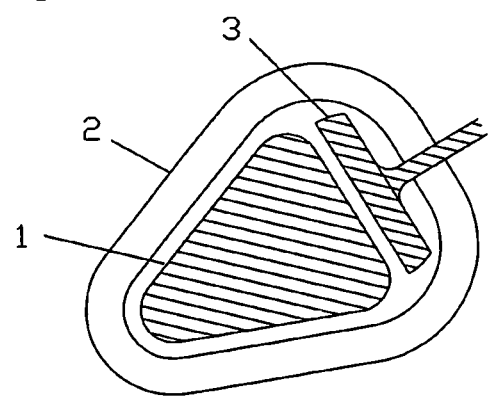
Fig. 32-B
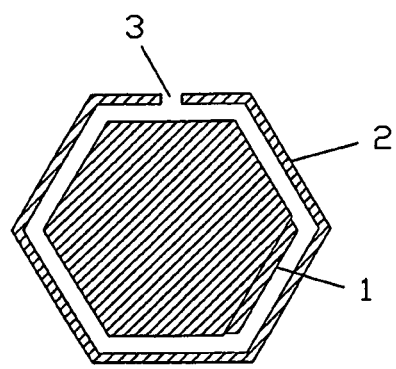
Fig. 32-C
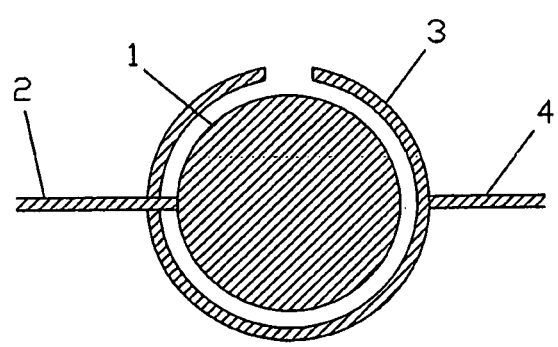
Fig. 32-D

ULTRA MOBILE COMMUNICATING COMPUTER WITH FINGER HOLES TO EASE GRIP

BACKGROUND

Computers can be shrunk to hand held and pocket size, such as PDAs, yet be multimedia devices handling data, voice, music, pictures, video, and even other sensory data such as smell. They can also have wireless connectivity for internet connection, phone calls, emails, web surfing and radio.

Cell phones, like computers, can also have computer, photo and video and Internet capabilities.

Even though our focus will be on Cell phones, Smart Phones, Pocket PCs and their hybrids or combinations, other hand held devices, such as pagers, text massagers, digital cameras, GPS, music systems like iPod, satellite and internet radios, tiny TVs, game gadgets, remote controls, all use the same basic principles, blurring inter device lines. In essence they are all customized computers.

We refer to all such currently available primarily PDAs, Smart phones & Cell phones, as Mobile Communicating Computers or MCCs.

This application introduces Ultra MCC or UMCC, being much better than MCCs, in many ways. "Um-See" is suggested as an easier pronunciation.

Even though emphasis is for most usable hand held or Pocket size, UMCC can be larger.

MCC Structure

Most MCCs are a Pocket PC, Cell phone or Hybrids, some called Smart Phones.

Their approximate size range is 10 to 20 mm thick, 40 mm to 80 mm wide and 90 to 130 mm long. The larger ones are awkward to carry. Being too small inhibits operation without adding value. A preferred range is (10–15)×(40–65)×(100–120).

They typically have many but not necessarily all of following Parts:
 keyboard
 buttons and or other digital data input means
 stylus, acting as a mouse
 wireless connection to nearby devices, such as blue tooth or IrDa
 memory and or memory sticks
 processor and core memory
 touch screen layer over an LCD screen
 screen, usually LCD
 optional goggle
 housing or shell
 battery and charger
 add-ons and attachments
 connector ports
 keypad
 wireless connection to wide area networks
 antenna
 speaker and or earpiece
 microphone
 digital still and or video camera Parts at the top of the list form a Pocket Computer, those at the bottom make a Cell Phone. Some such as screen, housing, battery and add-ons are found in both.

Cell Phones wide area wireless can also connect to the Internet, adding needed or desirable features like email, web, IP telephone, photo and video transfer, all requiring memory, processor, keyboard and stylus, it seems logical to add both groups of parts to make a MCC.

Categorizing UMCC Components:

UMCC is a configuration of Digitizers, Realizers, Communicators, Processors, Memorizers, Interfaces, Power (generating and or storage) and Facilitators (Housing, Cables, I/O, etc.)

Digitizers or Inputs Convert Source Data, usually analog into Electronic Bits. They can also convert Information into Photonic, Electro-Magnetic, or other Basic Units, and may be called Quatizers.

Examples of Digitizers for different "types" of Source Data are:
Sensory Digitizers:
 Keyboard to convert Text to Bits
 Microphone for Sound including Voice
 Camera or 2-D Scanners (essentially the same) for 2-D Pictures—a Stream of which is Video
 3-D Scanners (Usually Laser) or 3-D Cameras, for 3-Dimentional Shapes
Digitizers for Compound Senses are more complex, hence still under development, such as:
 Smell (a combination of characteristics of gas molecules entering smell sensors)
 Taste (a combination of characteristics of liquid molecules sensed by taste buds)
 Touch (a combination of Pressure, Temperature, Vibration, Topography, Electrical Charge, Humidity, etc. at a point on touched Surface, which would necessitate many devices, one for each sensation).
Non-Sensory Digitizers:
 Buttons for Commands
 Mouse and Stylus for Screen Coordinates
 Joystick, a multi task Mouse for Coordinates, Pressure, Speed, Direction, etc.
 Geo Positioning Systems or GPS for Coordinates
 Magnet for Electromagnetic field's Direction and Intensity, easily sensed by migrating birds
 Radio Activity (Geiger) Counter for density and type of radioactive rays or particles
Realizers or Outputs convert Digitized Data or Bits to resemble Real Source Date for consumption:
 Printers and Screens to convert Digitized data to be used by Eyes
 Speakers for Sound or Voice
 Vibrators for Body (Skin, Flesh, Bones)
 Brill Printers for Touch
 Rapid Prototyers for converting 3-D Data to Shape
 Corresponding Realizers for other Digitizers
 Communicators Transmit such Bits between Nearby machines such as Cables, Optic Fiber, IrDa, Blue Tooth, Wi-Fi, etc or Distant machines such as Optic Fiber or Light Beams for Light and Cable for Electronic or Radio for Electromagnetic Data.
Interfaces, are of many types such as:
 Communication Media Converters are used to Convert Optic, Electronic, Electromagnetic or other Media to each other. Say photons transmitted by optic fiber must be converted to electrons for cable.
 Modems are used to convert one protocol to another, say Analog Telephone Sound to Digital.

Processors, manage, process, manipulate, control various Digitizers, Realizers, Memorizers, Communicators, Interfaces, etc.

Memorizers Store Digitized data, permanently as in Flash or Temporary as in Core Memory.

Power, generated externally (mains) or internally (photocells & fuel cells), stored on Batteries.

Facilitators, Connectors, Jacks, Plugs, Cables, Boards, Cases, etc.

BRIEF DESCRIPTION

Admiring the advances so far to bring the power of computers and radios to personal hands, MCCs have a lot missing by way of ease of use and handling. Our aim is to make an UMCC to reduce or eliminate many of MCCs undesirable features, and to add new needed or desirable ones.

For example, cell phones are easily lost, especially by those without a belt or pocket. Also they occupy one hand for holding and the other for typing, and lack proper desk free walk and type keyboards.

UMCC has a number of following advantages over prior art:
- Care free handling, enabling users to carry It anywhere anytime
- Hands free carrying, buy introduction of light and small (not clunky) wearable means
- Hands free operational support, using none or one hand, by using body as support or light and small (not bulky) gear that holds and supports it in operating position
- Desk free, walk & type operation
- Ready to use, not requiring many pre operation set up, such as pulling out of pocket, opening the cover, plugging a keyboard, or other steps, by having simple (not elaborate) means to keep them in operative modes as long as necessary
- Fast, touch sensitive, multi finger, large spaced keys, yet small keyboard
- It is Thin and light, can fit in one pocket together with all hands free holding attachments
- Can have enough capabilities to reduce any need for other devices to be carried
- Own power generation, by thin, large photocell pads or use of body heat
- Has larger Screen, Keyboard than is possible and also practical conventionally
- Lighter, Thinner and or more powerful battery, because of solar energy and thin batteries
- If not made small, it can be alternatively more capable per unit of size
- Bi-directional screen (aligned with or perpendicular to the body)
- Disintegrable, not to have to carry unnecessary components, by dividing it into preferably slim parts that can be assembled or disassembled
- Reconfigurable to various modes of operation, by choosing the right assembly of parts
- New Sub-Assemblies such as Ear Piece, Ear Borne Cell Phone, Ear Borne Music System
- Said Sub-Assemblies being able to integrate into a powerful multi media device
- More efficient inter media system, by introduction of a new method of labeling data packets
- Soft to touch and hold by said less rigid outer shell
- Not lost or forgotten, by being easily and conveniently attached to user
- Added capabilities, such as helping the speech challenged, multi sense conversion, crime prevention, computer remote control, musical keyboard, silent talking, translator, game gadget, by adding means, such as an additional screen and or using existing means

BRIEF DESCRIPTION OF THE DRAWINGS

FIG. 2—a Pad (A), Garment Hook (B), Belt Loop (C) and Safety Pin (D) to suspend UMCC
FIG. 3—a neck borne UMCC with 2-Pad keyboard and 2 photocell pads
FIG. 4—a belt borne UMCC
FIG. 5—a UMCC using a holder—plate to suspend from User's short or pocket
FIG. 6—a UMCC pinned to sleeve, having a 1—pad keyboard and one photocell pad
FIG. 7—a head borne UMCC
FIG. 8—a neck borne UMCC with gear to hold its keyboard visible to the eyes for typing
FIG. 9—a variable length necklace and with gear to hold UMCC horizontal
FIG. 10—a belt borne UMCC, using holding plate with gear to hold it horizontal
FIG. 11—a notebook, held by belt or necklace and kept horizontal by another necklace
FIG. 12—three types of electromechanical hinges
FIG. 13—an elastomer hinge
FIG. 14—components and cross section of an elastomer electromechanical hinge
FIG. 15—another elastomer electromechanical hinge and its cross section
FIG. 16—an elastomer electromechanical pivot
FIG. 17—an assembly of electronic plates that can pivot in all 3 dimensions
FIG. 18—slide pivoting plates with electronic traces
FIG. 19—slide pivoting plates with cables
FIG. 20—4 views of an Ear borne cell phone with photocell pad
FIG. 21—ear pieces, with elastomer suspenders, one with microphone extension
FIG. 22—earpiece, with elastomer suspender, goggle extension, microphone and extra photocell pad
FIG. 23—thin goggle, with elastomer suspension to ear, also shown in use
FIG. 24—UMCC on wrist, with photocell, screen and keyboard
FIG. 25—thin Plug, Jack, and electromechanical Slide using elastomer instead of spring
FIG. 26—a UMCC with Bi—Directional Screen
In all Figures, UMCC Screen is shown as a rectangular board with an oval inside. Keyboard is shown as a rectangle with tiny circles on it to resemble keys. Photo Voltaic Film is shown as a rectangle with tiny dash or hyphen lines on it.
Added Figures.

DESCRIPTION

In following sections we will address many problems with existing MCCs and introduce solutions. Also we will introduce a number of preferred versions of UMCCs.

UMCC Protective and Hand Friendly Exterior

Conventional Shells are rigid, somewhat unfriendly for hands to held and for body when in pocket. Rigid shells make a noise when touching a desk and break more easily if dropped.

An Elastomer Shell will solve both problems. Elastomers referred to here as Rubber, are materials such as silicones, polyurethane, latex or the like are flexible, stretchable, retractable and can be made to various degrees of stiffness and lightness. They can be made stiffer to protect inside components, yet softer on the outside for crash protection and hand friendliness.

Figure 1:
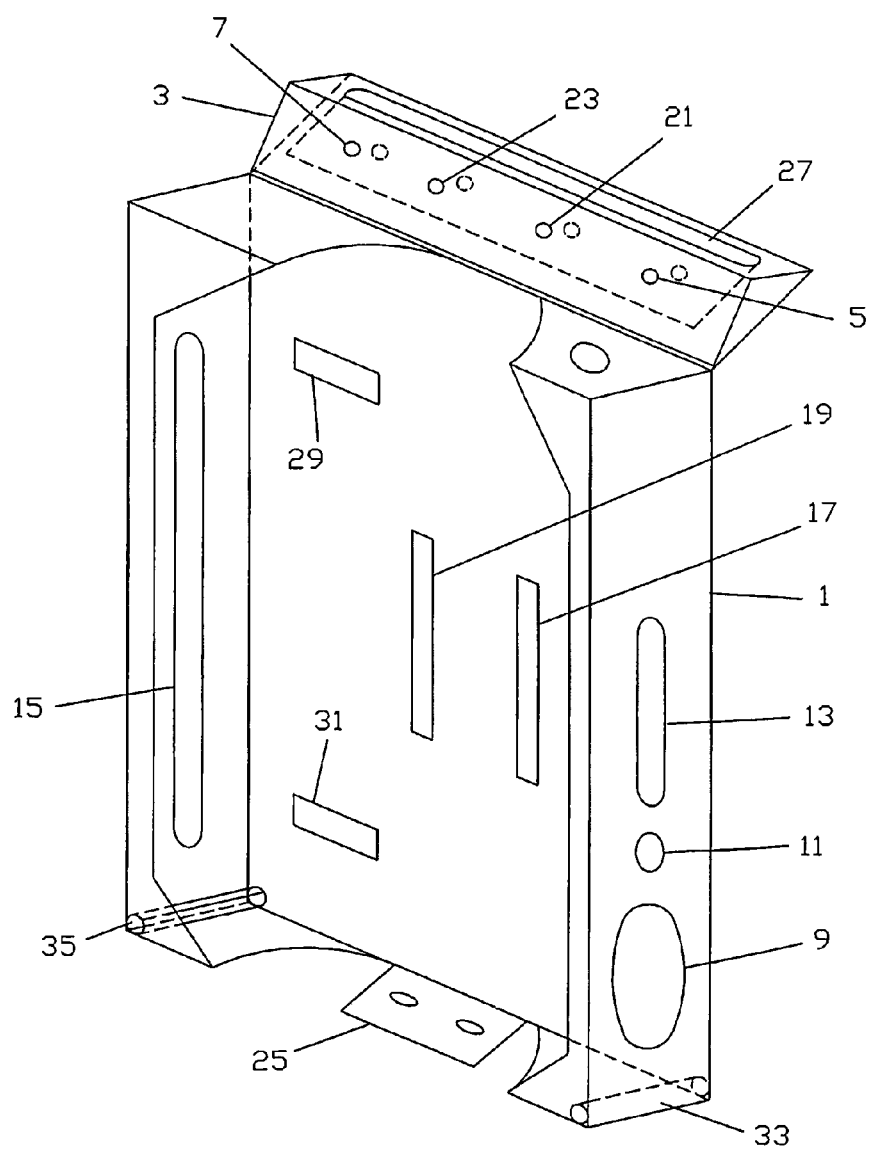
FIG. 1—a UMCC shell for protection and attachment of carrying and support gears.

Alternatively, a removable an-add on Elastomer Shell referred to as "Jacket" as in FIG. 1-1 to cover the UMCC, preferably all around, except for needed openings, provides protection and softness.

Jacket better be slightly smaller but stretchable to hold the UMCC firmly. It should have openings 9, 11, 13, 15 and be shaped such as to allow functioning of screen, keyboard, other parts and add-ons. Each Jacket can be made of more than one material such as leather, cloth, etc.

Shell or Jacket can have means of attaching to hands free carrying and holding mechanisms, explained separately. Even a millimeter thick Jacket can achieve the desired softness and protection.

One major advantage of Jacket or a Soft Shell introduced hers is that it can be custom made to accommodate many attachments for hands free carrying and operation introduced in this application.

Hands Free Carrying of UMCC (in Standby Mode):

It is very desirable that hands are not tied up for carrying or holding UMCC.

Wrist carrying is currently limited to tiny, not very useful devices.

Pocket is not ideal as UMCC should be pulled out before operating, hence not ready to use. Besides, a loose bulk inside pocket is awkward and many clothes do not have a pocket.

Belts are not always worn. Conventional belt MCCs typically do not let using of MCC while on belt.

Figure 3:
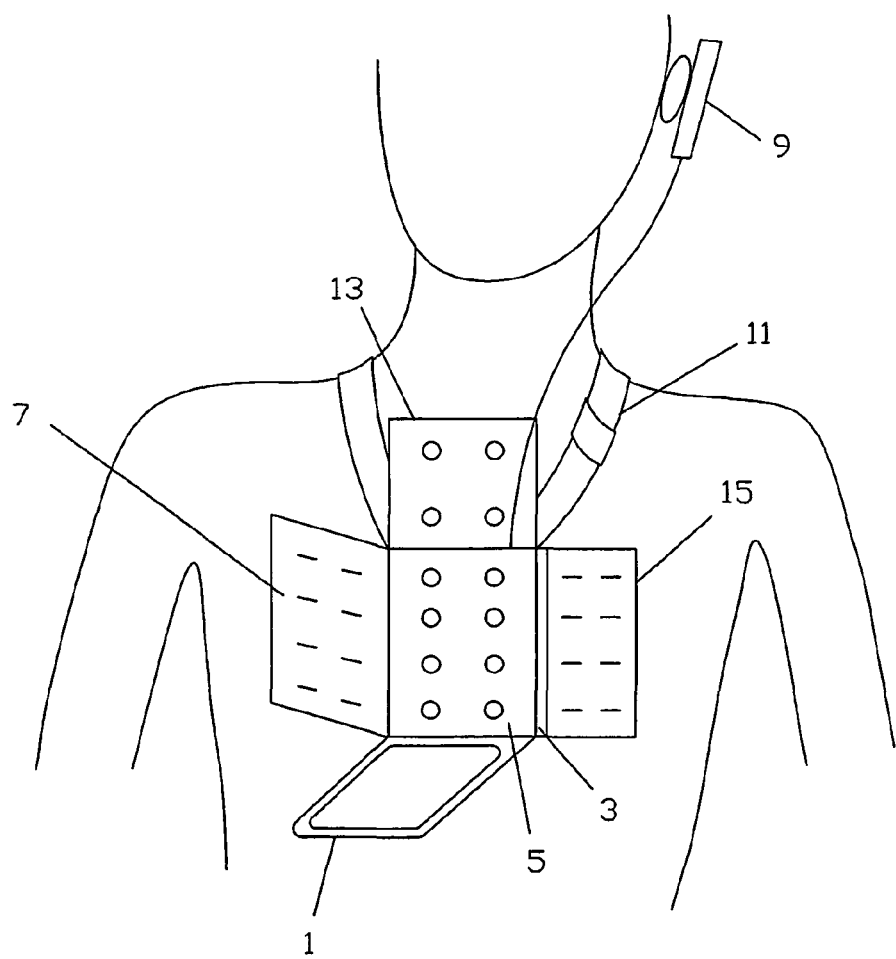

This application introduces following hands free carrying techniques:

1-Necklace for suspending UMCC from Neck as in FIG. 3. Ideal for proximity to mouth, ears, eyes, etc. Said Necklace, shown in FIG. 9-A should preferably be:
  - attachable to two corners of UMCC, rather than one location, to reduce swinging of UMCC
  - have adjustable length using suitable buckles (FIG. 9-A-3) and or made of elastomers to be extendable and retractable detachable Necklace Hooks (FIG. 9-A-1& 2), go through Holes (FIG. 1-5 & 7) on Jacket Tail (FIG. 1-3), attached to Jacket (FIG. 1-1), suspends UMCC from User's Neck. Buckle (FIG. 9-A-3) can adjust length.

2—Belt Slits as in FIGS. 1-17 & 1-19 incorporated in the Jacket allow conventional belt carrying. Conventional belt wearing keeps UMCC in vertical position, not allowing horizontal operation.

Figure 4:
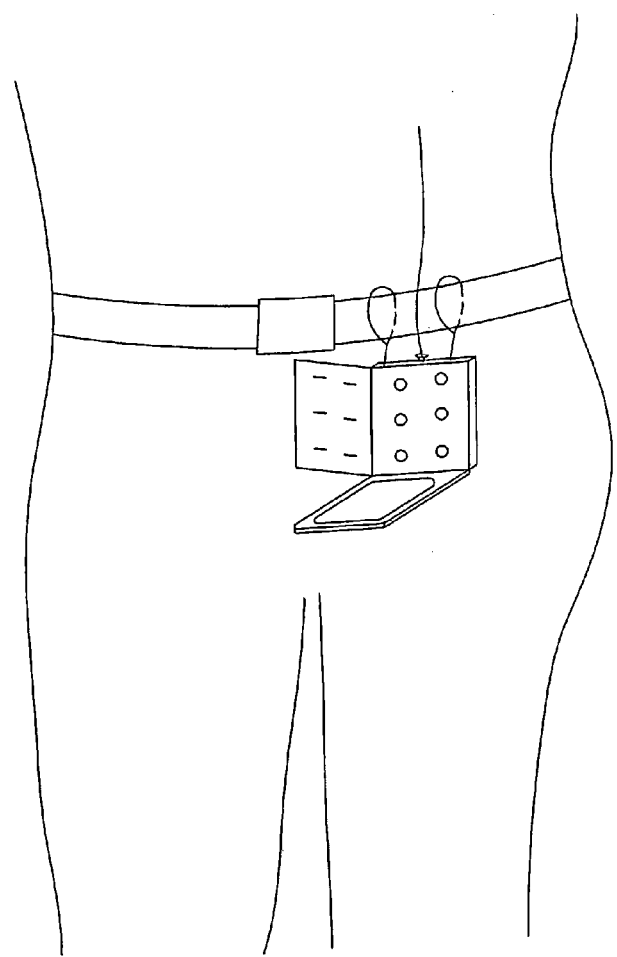

3—Belt Loop(FIG. 2-C), attached to Jacket via Hook (FIG. 2C-1), going through Tail Hole (FIG. 1-5), and preferably a second Belt Loop attached via another Hole (FIG. 1-7). User's belt going through Loop(s) 2C-2 suspends UMCC, and allows being held for horizontal operation (FIG. 4).

4—Pant Hooks as in FIG. 2-B, attached to Tail Holes (FIG. 1-5 & 7) from lower end (FIG. 2-B-2) and hooked to User's trousers belt loops, suspend UMCC and allow it to be held for horizontal operation.

5—Garment Hook, similar to Belt Hook in FIG. 2-B, but with a sharp tip FIG. 2-B-1 to penetrate and hook up to garment, while its lower end (FIG. 2-B-2) is attached to the UMCC Jacket via Jacket Tail Holes. The same device can do the job of both Garment Hook and Belt Hook.

Figure 6:
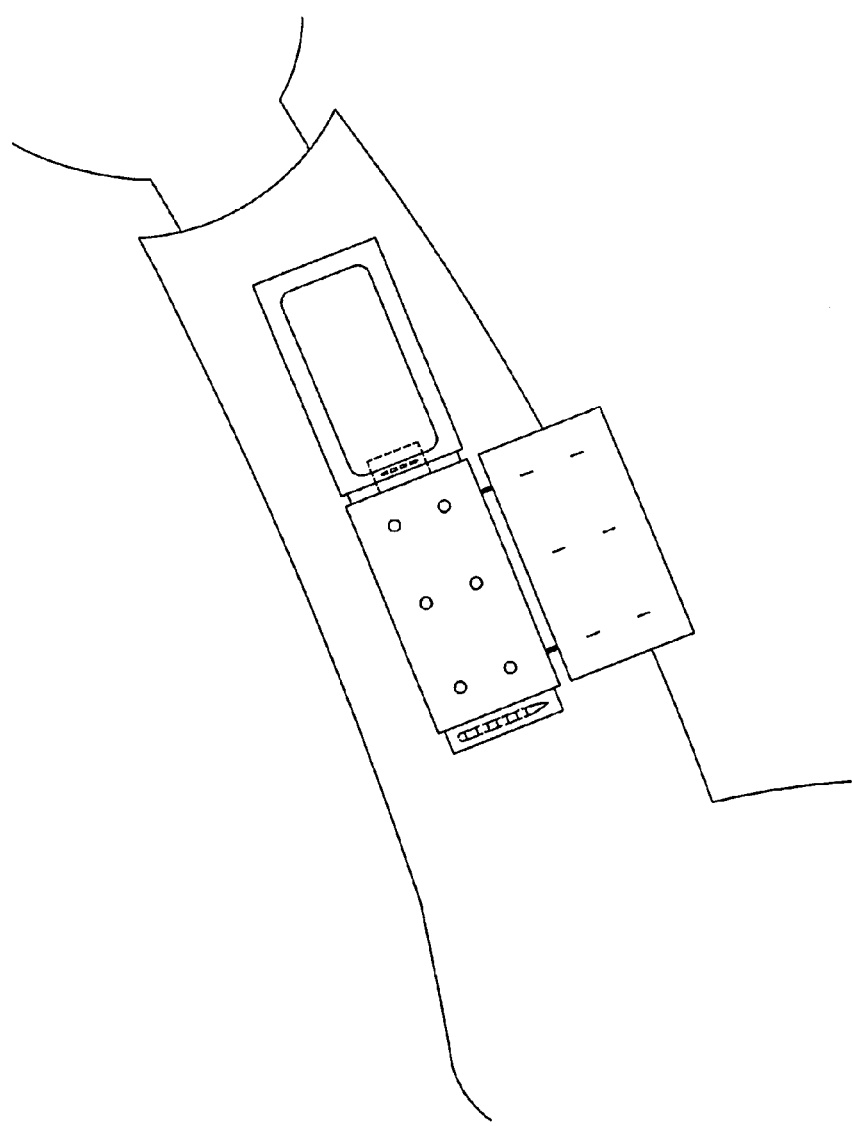

6—Safety Pin (FIG. 2D), having a sharp Pin (FIG. 2-D-1), goes through Jacket Tail Holes (FIG. 1-5, 7, 21, 23) and simultaneously penetrates and attaches to garment. Safety Rubber (FIG. 2-D-2) then stretches to cover the sharp tip. Thus UMCC is suspended from User's Garment and-can be held in horizontal position, if so required for operation. FIG. 6 shows such pinning to user's sleeve.

7—Suspension Pad (FIG. 2-A), one end of which is held inside the Jacket Tail Pocket (FIG. 1-27) as shown in FIG. 5-A. The rest of said Pad is inserted into a Pocket or even inside a Short (FIG. 5-B) The Jacket Tail pivots along its common joint with the Jacket, holding the Pad between User's body and User's short, holding Jacket and hence the UMCC as in FIG. 5-A & B.

Figure 7:
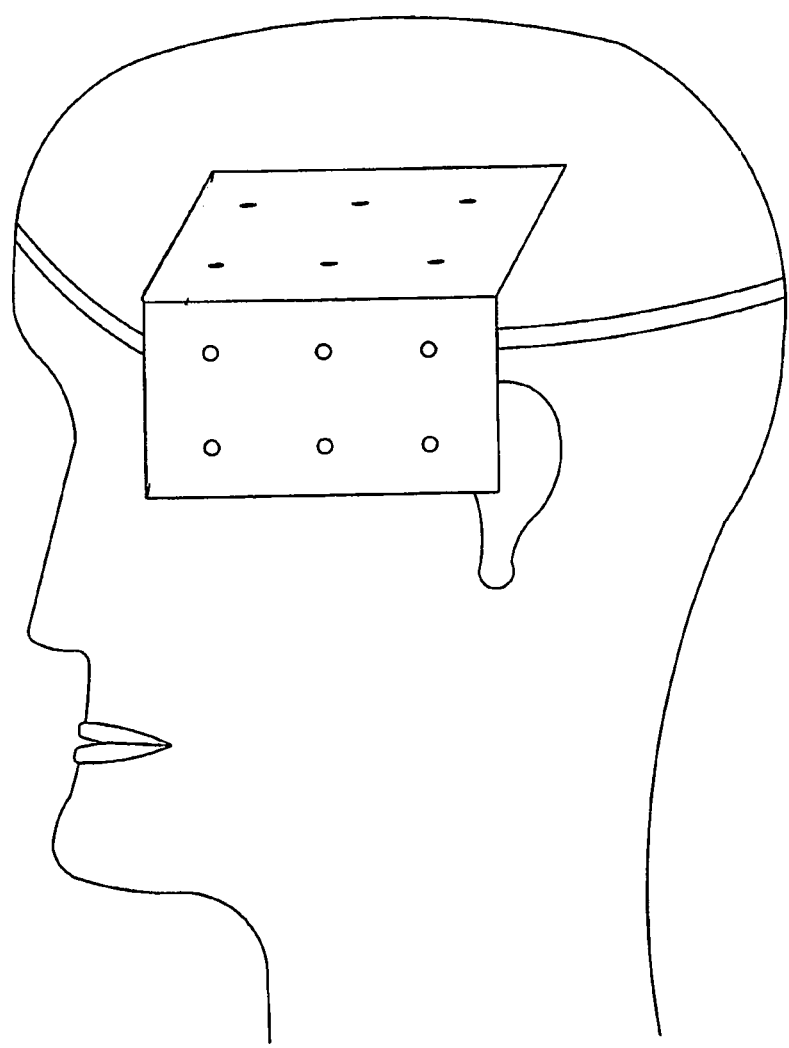

8—Head Band, running through Slits (FIG. 1-29 & 31) suspends Jacket and UMCC to Head as in FIG. 7. For some applications, say when the screen is a goggle or for repairmen, Head Band is useful.

Figure 24:
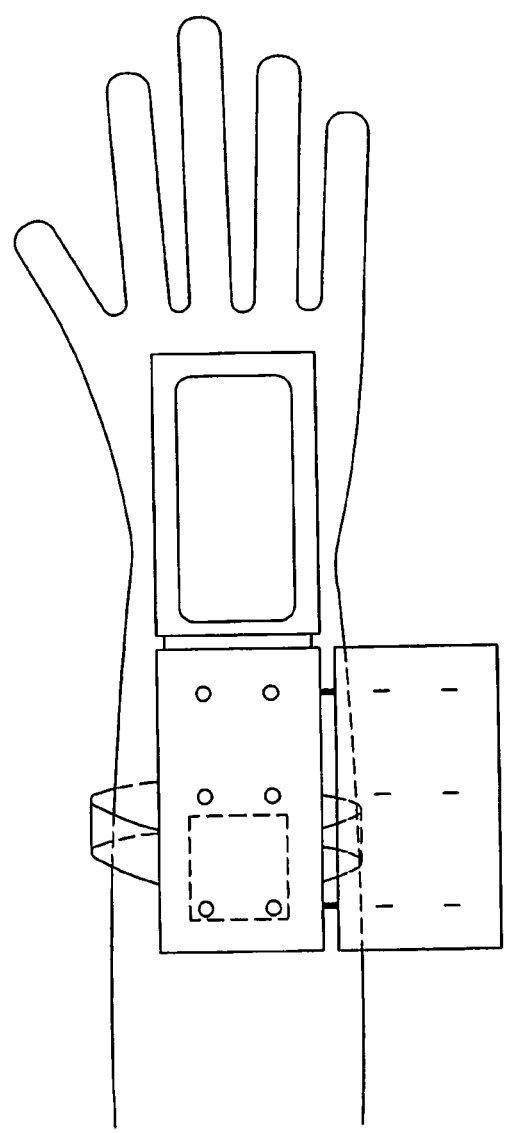
Figure 26:
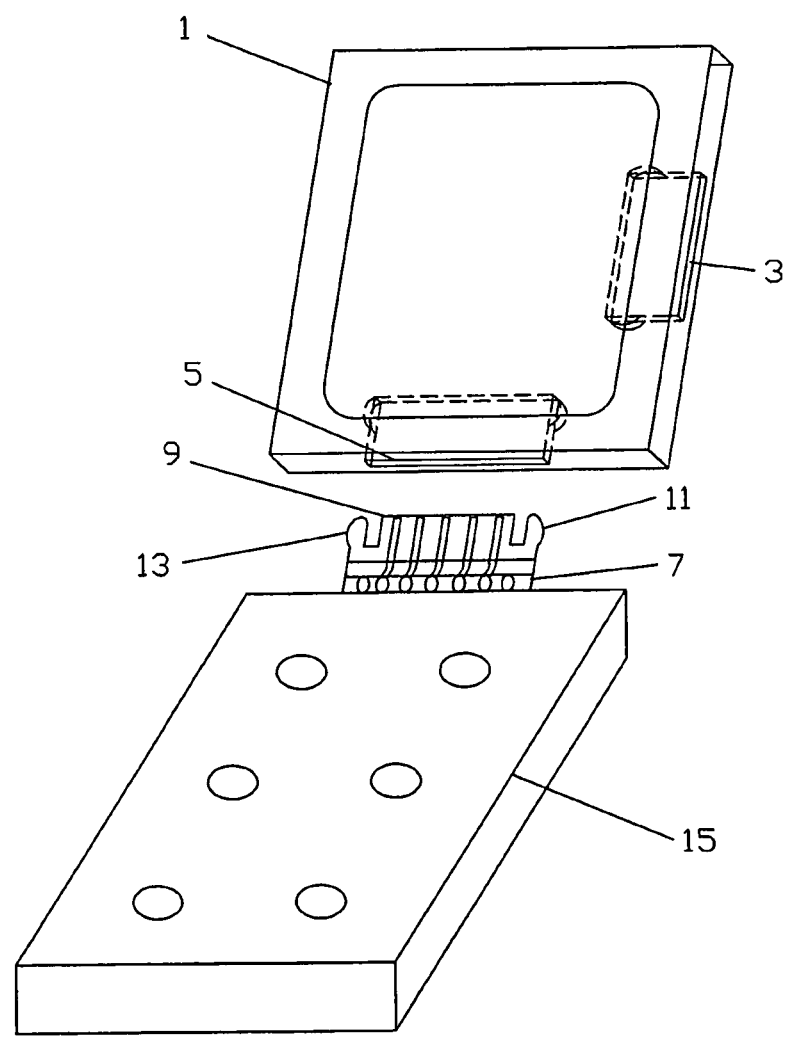

9—Wrist Band, running through Jacket Slits shown in FIG. 1-17 & 19 holds UMCC to User's Wrist. FIG. 24 shows a UMCC as worn on wrist. Screen need not inhibit movement of hand as it can be firmly kept at an angle easy for eyes to see, not touching the back of the hand in any hand move. Conventionally, only tiny watch type devices could be wrist worn, as without many techniques hereby, a larger screen, keyboard and photocell pad could not be placed on wrist.

10—Shoulder Strap, useful for some heavier or larger UMCCs

Notes:
  For UMCCs without a Jacket, the word Shell can be substituted in above techniques
  Above techniques show preferred technique for each result, other techniques can be used
  Above techniques require very simple, light, small apparatuses, which can easily fit into a small pocket, even together with UMCC
  Conventional hands free techniques, if any, are for special devices and or are bulky & clunky
  Equivalent ways of suspending a UMCC from Neck, Belt, Garment, Short, Head, Wrist, etc can be used, without undermining applicant's notion of making UMCC hands free, and horizontal for operational id desired, detailing all of them is not necessary for the skilled
  A Tongue (FIG. 1-25) plus a safety Pin can be used to fix the other end of UMCC to Garment, fixing UMCC in place, which may be desirable when UMCC is suspended by Safety Pin, Necklace, Hooks or Loops, to prevent UMCC swinging sideways or away from Garment
  Jacket and or Shell Tail and or Tongue can be detachable from Jacket or Shell
  One major advantage of Jacket, Necklace, Belt Loops, Pant Hooks, Garment Hooks, Safety Pin, Suspension Pad, Wrist Band, Head Band is that UMCC can be easily detached from them when so desired
  Jacket need not have all above attachment features, but only as required and desired
  Jacket need not cover most of UMCC, so long as it can hold the UMCC, say via 2,3,4 corners or by Velcro or other means, and it can be just a soft or rigid pad Other techniques of attaching said suspending apparatuses to UMCC, such as Velcro, Clamps, Adhesives, etc, can be used too, detailing all is not necessary for the skilled Hands Free carrying also solves the problem with hand carried Cell phones or MCCs which are frequently lost or left behind.

UMCC Hands Free Operational Support

Suspending UMCC from belt, wrist, garment or neck enables viewing of UMCC Screen, without hand holding, by keeping the Screen towards the eyes, as in FIGS. 3, 4, 5, 6, 8, 10, 11.

Suspending UMCC from belt, neck, head, wrist or garment uses User's body as support needed for a "vertical" keyboard when typing, without hand holding. Users are better off in the long run to learn typing without looking at the keyboard, to avoid extra gear or handholding to look at the keys.

If looking at the keyboard is also desired, suspending UMCC from Wrist or Sleeve is one option.

Another option is to use the one hand for holding the UMCC while typing by other hand. Suspending UMCC using Necklace, Belt Loops, Pant Hooks, Garment Hooks, Safety Pin and Suspension Pad as constructed in this application enables User to do so, without having to dislodge the UMCC.

To provide "hands free" keyboard support and keyboard viewing, when UMCC is suspended from neck or belt, following techniques are introduced, aimed at holding the keyboard in horizontal position.

Figure 8:
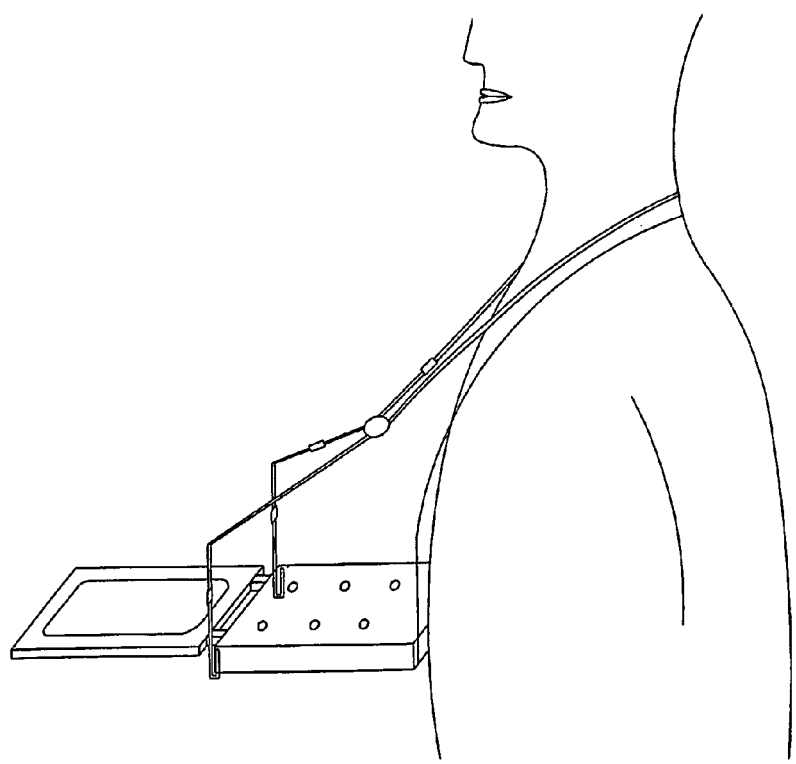
Figure 9:
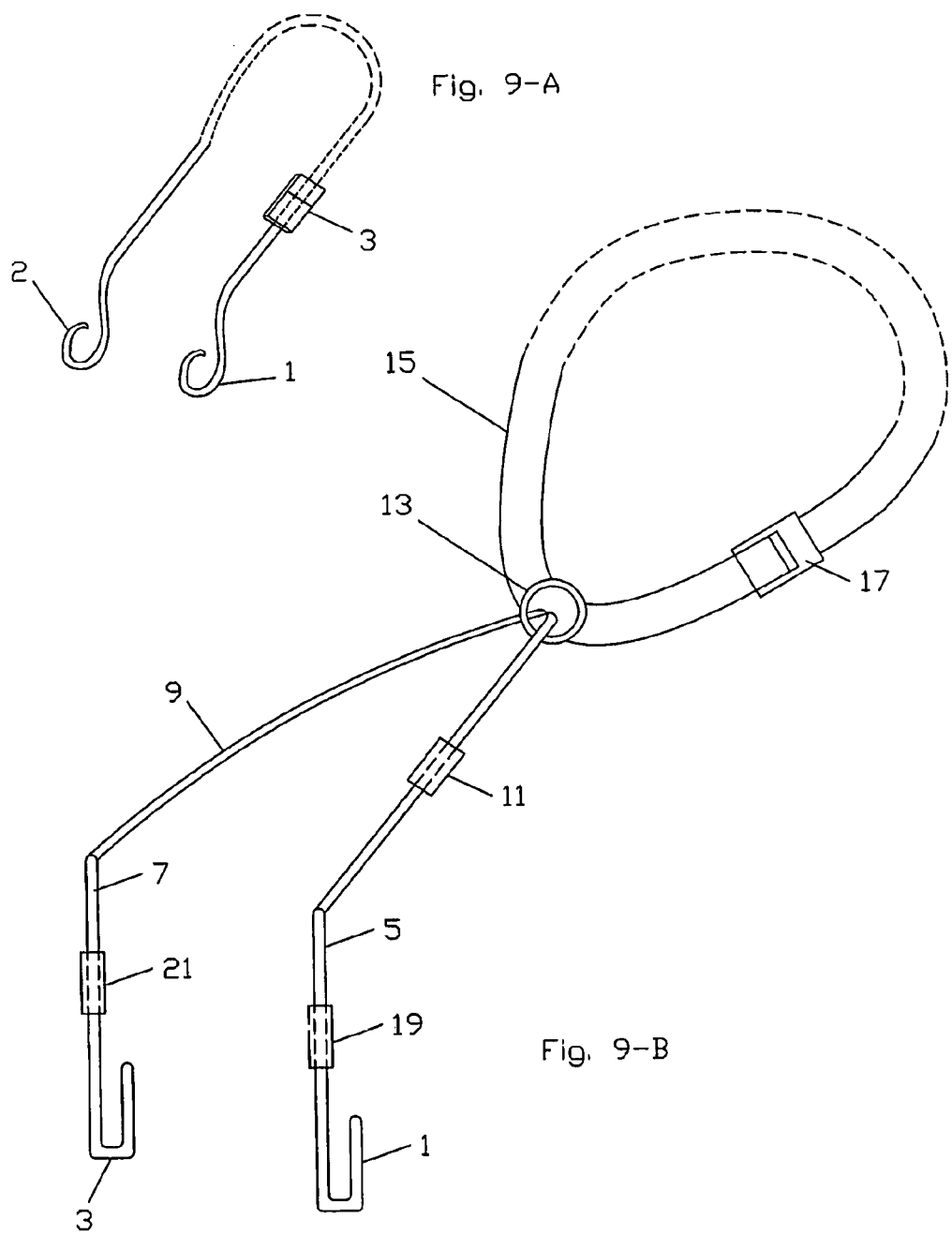
Figure 10:
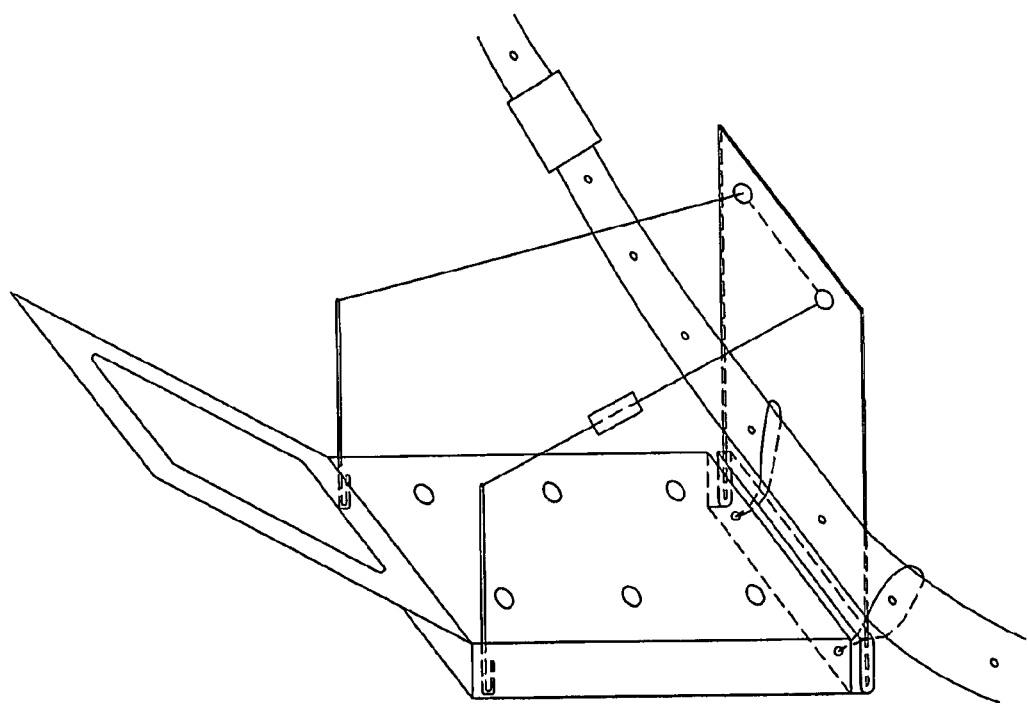

"UMCC Support" shown in FIG. 9-B has two rigid J shaped Rods or J-Rods. The curved end of J-Rods (FIG. 9-B-1 & FIG. 9-B-3) can hook into UMCC Jacket Tubes (FIG. 1-33 & 35). The straight part of J-Rods (FIG. 9-B-5 & FIG. 9-B-7) are attached to a String (FIG. 9-B-9) which can use a Buckle (FIG. 9-B-11) or other mechanism to have adjustable length. Said String runs through a Ring (FIG. 9-B-13) attached to a Neckband (FIG. 9-B-15), preferably with a Buckle (FIG. 9-B-17) or other length adjuster.

Said UMCC Support holds UMCC horizontal, when UMCC is suspended from Neck, Belt or Garment using the Necklace or other gear introduced here (FIG. 8)

J-Rods can have adjustable length mechanism (FIG. 9-B-19 & 21) if desired. They are chosen longer so that said String is not too close to keyboard to inhibit typing. But for most uses, J-Rods can be as short and replaced by Hooks.

Adjusting the length of said String or Neckband offers User's desired angle of operation.

Said Necklace and Neckband can be joined to make one device, to both Suspend and Support UMCC.

UMCCs without a Jacket can use equivalent techniques for above results. For example said String can be attached to UMCC Shell by Velcro or other means.

Current gear for holding MCCs in operational mode are bulky and designed not for public use but for field technicians. Our above gear can all be carried inside one pocket together with a pocket UMCC.

Above techniques make UMCC Ready to Use, not requiring the current pulling out of pocket, penning the cover, plugging or other steps before operation.

Notebook & Tablet Holder

A Necklace+Neckband combo as detailed separately makes an ideal "hands free" Carrying and Operational Supporting Device for Laptops, Notebooks, Tablets and other heavier devices too.

Figure 11:
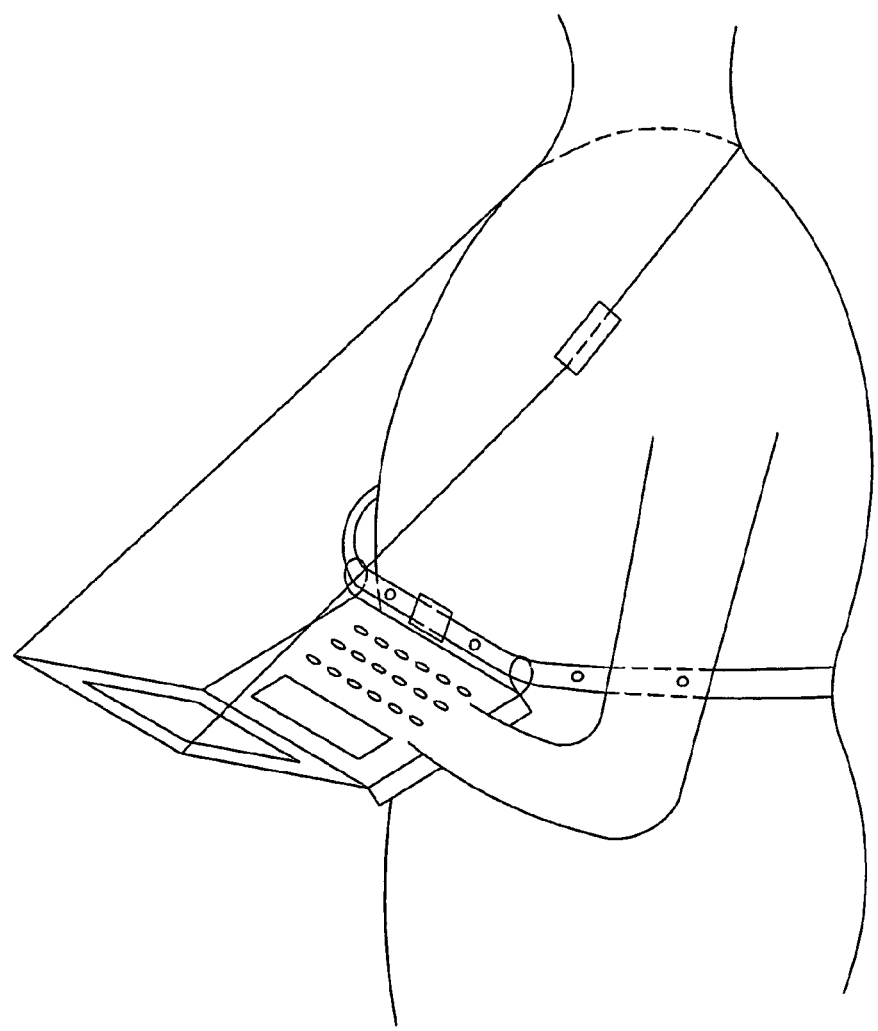

FIG. 11 shows a simpler version of the same technique, combining said Neckband and String to Support a Notebook or Tablet computer in operational position, while they are Suspended from Neck or Belt using techniques introduced here.

For Operational Support when UMCC is suspended from belt, Spring (FIG. 9-B-9) runs through Suspension Pads Holes (FIG. 2-A-1 & 3). One end of said Suspension Pad is inside Jacket Tail Pocket (FIG. 1-27) as shown in FIG. 5-A. Said Suspension Pad is held against User's body behind User's belt, keeping it in upright position, supporting UMCC as in FIG. 10.

Proper UMCC Keyboard

MCCs do not have their own proper keyboard. The best offered so far are separate keyboards which even though portable and good, require an extra pocket to carry, a desk to operate, and many set up steps prior to each use, all contrary to ultra mobile walk & type, ready to use that they should be.

Alternatively they use tiny keyboards or keypads which not only reduce the size of the screen but are slow, tedious, one finger, thumb or stylus, high pressure operation.

Applicant has filed for patenting in US and elsewhere, a group of keyboards called E-Board or E-Pad.

E-Board has all the good features of both above tiny and desk-bound groups, none of their disadvantages and many other features detailed separately.

It is thin, touch sensitive, one or two hands, multi-finger operation with a full set large, spaced keys, on one or more Pad(s), which Pad(s) can be supported by UMCC body or as a rigid fold over or cover.

UMCC can use a one Pad E-Board (E-Pad), for one hand operation or two pad version for two hands. A 2-Pad E-Board suspended from neck or belt has some of the characters one the pad operated by left hand and ditto for the right hand Pad.

In FIGS. 3, 4, 6, 7, 8, 10, 11, 20, keyboard or E-Board surfaces are shown by six or more tiny circles.

Notes:
- E-Board does not share working surface with Screen, allowing both to be larger
- E-Board can eliminate Stylus and Touch screen by having its own Mouse Key
- E-Board can encompass UMCC Buttons, increasing Screen size and reducing overall bulk E-Board Features: the Only Keyboard Offering Features A+B+C Concurrently A—Portable Desk-bound Keyboards, such as Foldables, Rollables, Light Rays, etc. only offer features (A) below, but NOT specialties of Tiny keyboards (B) nor of E-Board (C):

1—Are touch sensitive, no need to press
2—Are multi-finger, one or two hands
3—Have Large, Spaced keys
4—Enable fast touch typing
5—Do not reduce the already small screen size to less than half
6—Do not need stylus, unlike Handwriting or Screen keyboards
7—Do not require routine editing, unlike Handwriting Recognition B—Tiny keyboards, such as Berries, Mini's, Screen-Keys, Handwriting Recognition, etc. only offer features (B) below, but NOT specialties of Desk-bounds (A) nor of E-Board (C)

1—Do not need a desk (Walk & Type)
2—Do not require a dedicated pocket to carry
3—Are light, less than 20 gr, unlike 150 gram Desk-Bound keyboards in "B"
4—Are thin, fit in same pocket as PDA without bulging, unlike 15 mm thick desk-bounds
5—Are "Ready to Type". No setting up, prior to each use (a major drawback). No need to:
   pull out of pocket, as it accompanies MCC (PDA or Cellphone) which is out for use open up, as it is opened when MCC is inn use
lay down on a desk, as it is already on the arm or palm when MCC is in use
connect to MCC or align with Infra Red Receptor
reversing above after each use C—E-Board, offers advantages (C) below+of Tiny keyboards (B)+Desk-bounds (A):
1—Can increase screen size by incorporating buttons
2—Doubles as MCC cover, reducing overall weight & volume
3—Has more efficient character layout version, standard Qwerty is not optimal
4—Has one hand and two hand versions
5—Can have own power supply and even charge the MCC
6—Can eliminate Touch-screen & Stylus, by having its own Mouse Key
7—Hence can further reduce overall cost, weight, volume & complexity
8—Has Detachable and Integral versions
9—Has replaceable character layout, wearable and other varieties and/or options Voice Recognition: hailed by some as the future only suits certain circumstances such as short commands while driving. It has too many disadvantages to be a contender for general data entry. It can also be added to UMCC for certain uses.

UMCC Power Generator

Carrying a heavy integral battery, extra battery and battery charger can be greatly minimized by use of own power generation.

Fuel cells are a solution, but require fuel capsules, and are typically not as thin as desirable. Body heat conversion to electricity is another solution, but requires some touching of body. Our preferred techniques is use of one or more thin Photo Voltaic Film or Cell (PVF).

PVFs can be sub-millimeter thick, one currently available has a polymer substrate. Each PVF can be substantially as wide and as long as other larger components of UMCC, such as Keyboard or Screen. PVF Pads can slide inside the UMCC assembly for transport and out for power generation. They can also be attached to UMCC sides, folding over or under UMCC for transport, opening up to face light. FIGS. 3, 4, 6, 7, 20, 22 show PVF's surface by hyphens or dashes.

Alternatively or in addition, E-Board used as keyboard can have Photo Cells on its surface, or PVFs.

PVFs can markedly reduce the size of UMCC battery, by constantly charging it.

UMCC Power Storage

In addition to or as an alternative to batteries, thin Rechargeable Battery Film (RBF) can be used. Current versions are called polymer batteries but other versions are being developed. They can be thinner than one third millimeter, but also thicker and or multi layered for more capacity.

One ideal "combination" is RBF's surface attached to PVF's non-light sensitive surface, enforcing each other, reducing the need for protective layers and for wiring, forming Electricity Generating and Storage (EGS) Pads, which can attach to sides of UMCC or other devices, fold over or under UMCC or slide inside the UMCC assembly for transport.

RBFs are not specifically identified in figures as their preferred location is invisible behind PVFs. PVF, RBF and EGS Pads can be made detachable from UMCC.

One advantage of using PVF, RBF or EGS Pads is that various components of UMCC, such as Keyboard, Screen, Goggles and especially Earphone can have their own power, and hence can be physically separated, yet wirelessly connected to other components.

Non-Rechargeable Film and other types of small and or thin batteries can be used in certain UMCCs.

Thinner UMCC

Following Pocket Friendly tips are often ignored in construction of conventional phones or PDAs:
1—A dice is smaller and lighter than a credit card, but much more difficult to carry in a pocket or wallet.
2—A credit card with a dimple or lump on it its surface is more difficult to carry than a number of credit stacked cards which together are heavier, even bulkier than said credit card.
3—A credit card which is curved is much more difficult to carry than a flat one.
4—A 1×70×120 mm card has almost twice the surface area, but is as easy to carry in a pocket or hold in hand as a credit card, since it has pocket and palm friendly dimensions.

For ease of holding, pocket portability and body support when suspended from neck, belt or garment, it is important that UMCC is thin, flat, with few or no protrudes. To compensate lost volume of thinning, surface area should be increased, up to width and length limits dictated by type of UMCC, say below 80×130 mm for pocket and hand held UMCCs.

For thinning UMCC, observing above Pocket Friendly tips, any number of following can be used:
  Spreading components thinly over wider and or longer surfaces
  Reducing and or eliminating bulky or lumpy components
  Using flat surfaces for mounting components on, instead of curved ones
  LCD Screen preferably thinner than 2 mm or OLED screens which can be sub millimeter
  Thin Shell with few or no curvatures, lumps, humps, bumps, etc
  Thin Jacket preferably less than 1 mm thick
  Photo Cell Pads to reduce the needed size of battery
  Thin Battery Pads spread inside UMCC or behind Photo Cell Pad, Screen, Keyboard, etc
  Thin battery spread over larger area rather than smaller lumpier battery
  E-Board or E-Pad as Keyboard
  Eliminating Stylus, Touch screen by use of E-Board with a Mouse Key
  Positioning Buttons on E-Board
  Using Thin Flat Pads and other components where necessary and or possible
  Using Thin Electro Mechanical Hinges, Pivots, Swivels, Slides for joints between Pads
  Processor, Core Memory, Wireless, Ports, Speaker, Microphone, Camera can be chosen from thin versions, such as sub-millimeter piezoelectric speakers and microphones, or be custom made thin
  Thin Flash, SD or equivalent memory, spread over as wide an area as necessary (A 1×60×120 mm Flash Pad stores over 20 gig, even at today's commercialized technology)

Same thinning techniques can provide for more processing, storage, power and features, if size reduction is not sought. In other words, said techniques improve utility per thickness or size.

Larger Photo Voltaic Film (PVF), Screen and Keyboard

For PVF, Screen and Keyboard, the larger the surface area the better, exceptions allowed. Conventional MCCs, not using many of techniques Introduced here cannot easily have them large.

None have PVF

Many have no Keyboard, but use an external one, with troubles of carrying another device, setting it up with MCC for use, typically on a needed desk, not walk and type.

Many have a tiny thumb-boards, necessarily on same surface as Screen, shrinking both.

Some, resemble a laptop, have a Keyboard and a Screen, as large as possible for pocket, just as in a laptop, Keyboard is sideways to align with fingers span. The Screen must be sideways to allow it to fold over the Keyboard for transport. But that configuration is only good for desk. Holding in hand for operation is not comfortable even for largest hands.

This application introduces techniques enabling UMCC, not only have its own PVF, Keyboard & Screen, but each on separate Pad(s), each Pad as large as transportation allows, say pocket size.

Some such techniques are:

PVF or EGS Pads

E-Pad or E-Board, a special keyboard, which is as large as transport allows, say pocket size E-Board and E-Pad can rest either on UMCC body surfaces or on a separate Pad folding on UMCC A Screen which can be attached for both long and short side to UMCC Means for not having to hold UMCC in hand for operation, so that Screen, Keyboard and PVF or EGS can be placed where suited for larger surface area, without easy hand holding constraints Thin Electro Mechanical Hinges, Swivels, Slides and Pivots, allowing folding of many Pads over each other or over UMCC main body, without adding too much bulk (impossible conventionally)

Spreading components thinly over thinner larger areas, enabling a larger surface area for UMCC working surface(s), without adding to overall volume, hence allowing PVF, EGS, Screen and Keyboard, which must match the rest of UMCC in size, to also have a larger surface Above, each in their own way, enable much larger PVF, EGS, Screen and Keyboard than prior art.

For even larger Screen, Buttons should preferably not share a Pad with it, but be placed on:

Keyboard, as possible to do with E-Board or E-Pad

Screen's backside, using thin Buttons as in E-Board Keys

UMCC main body backside, using thin Buttons as in E-Board Keys

UMCC side walls

A (Preferred) Embodiment of UMCC

One preferred configuration is a UMCC Main Body, an E-Pad Keyboard, which rests on the top surface of said Main Body, a Screen attached along the shorter side of said Main Body, an EGS Pad attached along a longer side of said Main Body, all of which can fold over said Main Body or Slide into said main body.

In this application, UMCC Main Body refers to preferred version of Thin Flat Motherboard, on top of Thin Flat Battery Layers, but does not preclude other versions.

FIG. 3 shows an UMCC having many parts named here but detailed separately, such as:

UMCC Main Body (FIG. 3-3),

Screen (FIG. 3-1) which can be fixed facing User's eyes, folds over as UMCC cover for transport, and is detachable for re-attachment to UMCC body both sideways and length wise Keyboard or E-Pad (FIG. 3-5), suitable for one left hand multi finger use (for right handed persons)

Photo Voltaic Film to Generate Electricity from light

Thin Ear borne Cell-phone, encompassing cell phone components of UMCC

Detachable Hands Free Holding and Operating means (FIG. 3-11) to suspend it from Neck or Belt Above suffices for most needs but for heavy users, other parts may be added, such as:

Optional second E-Pad (FIG. 3-13), folding over or under or sliding inside UMCC Body Optional Photo Voltaic Film (FIG. 3-15) folding over or under or sliding into UMCC Body some and too little of other features. Custom making is difficult because consumers do not understand the interrelationship of so many features to order a custom made device or choose an optimum one.

Disintegrable UMCC

Dividing UMCC into separate Sub-Assemblies which are detached or detachable physically and connected to each other as necessary by cable or wireless has advantages in many situations. Each Sub-Assembly should preferably be thin and or pocket size to allow combinations of them also be thin and pocket size. Some examples of logical Sub-Assemblies are:

Battery

Screen

Keyboard

PVF and or RBF and or EGS Pad or Multi-Pads

Mother Board, having a Processor, Core Memory, Wireless Chip, Antenna, Thin In/Out Jacks Gadget Board, having Speaker, Microphone, Camera Mother Board+Gadget Board Combination Thin Earpiece Pad Thin Cell-Phone Pad having wireless phone related components, detailed separately Some UMCCs using said separation technique are introduced as follows:

1—Cell-Phone parts of UMCC to be separable to take, leaving the rest behind, detailed separately.

2—A powerful yet portable UMCC, perhaps bigger and or heavier than pocket size, suspended from belt or shoulder, likely positioned behind or at the side of User. Thus Screen and Keyboard or their combination which are smaller and or thinner for better operational positions should be separable.

3—A UMCC using and assembly of several Photo Cell Pads that can fold over each other for transport, suspended from User's Shoulders, Garment or Neck, spread preferably over User's back for power generation. Other parts of said UMCC should be separate from said power generator.

4—A UMCC with Detachable Speaker, Microphone, Camera, Memory, etc. Sub-Assembly(s), as not needed for most applications such as computing, email, web surfing, etc.

Reconfigurable UMCC

Is possible by making Sub-Assemblies in Disintegrable UMCC to attach to each other in various ways. Some of the ways said Sub-Assemblies can attach are:

attached electronically, physically detached, each Sub using its own power generation and storage attachable at one or more points and or from one or more sides or even from one or more corners One useful Reconfiguration is the Screen to be attached to the lower side of UMCC working surface, when suspended from neck or belt, such that it can be held horizontal facing User's eyes, but during game playing, it is attached to the upper side of UMCC working surface, facing the opposite player, so that each player sees the other player's screen.

Omni UMCC

MCCs have evolved from different platforms, such as Cell phones, Pagers, PDAs, Cameras, TV, Instruments, etc. As all became digital, combining and crossing their features lead to Hybrids, such as Phones with Computer, Photographic, Video and even TV features.

This application introduces a Custom UMCC, to be simple to understand, design, custom order or choose from its numerous configurations, together with a Uni-Media Protocol.

To consumers and many engineers, such Hybrids appear a mish mash of sometimes unrelated gadgets piled onto each other, just to attract young consumers. Consumer often gets too much of some and too little of other features. Custom making is difficult because consumers do not understand the interrelationship of so many features to order a custom made device or choose an optimum one.

A Custom UMCC can be constructed by making each of UMCC Components or Devices (Digitizers, Realizers, Memorizers, Communicators, Interfaces, etc.) standard, physically and functionally compatible with each other, so that designers and users can choose according to their requirements. Suitable Devices or Sub-Assemblies can be made to make UMCC Wearable or Portable. Detachable Devices and Sub-Assemblies can also be made, as detailed separately.

Numerous combinations and configurations of UMCC can be constructed. There can be:
   minimal configurations, such as Processor, Core Memory, I/O Jacks, like a Mother Board
   varieties of each type of Device to suit different uses
   desirable Sub-Assemblies like Speaker+Microphone+ Wireless or Cell-Phone
   logical choices for type of Devices, such as the right Processor Power Efficient Screen Modes Any number of following technologies introduced here, alone or in combination, will optionally reduce Screen power usage. These can be administered by Driver(s), Processor or Intelligent Software. Image quality will be compromised but being optional, will be adopted only when worthwhile. For Text, as in e-mail or messaging, color are not so important, nor is a background. These technologies can be applied to all devices which use a screen, especially where power is scarce.
   A—Text or drawing mode is selected, then background is not activated (remains black)
   B—User selects one of Red, Blue or Green as preferred color, to be shown, inactivating other two
   C—Activating only the prominent one of Red, Blue or Green for any point
   D—Activating only perimeter points of each same color area, instead of lighting up all area
   E—Calculating the largest pixels of same approximate color, such as all white pixels, regarding them as background and turning them off to black Bi-Directional Screen An optimal size for UMCC is 12×70×120 mm, matching a 70×120 keyboard and 70×120 screen. Optimal alignment of keyboard and screen varies with use. For example when UMCC is suspended from belt, its length aligned with body length as in FIG. 4, the screen should preferably have its length perpendicular to keyboard length, especially for viewing movies as is being offered on cell phones. But when the UMCC is aligned with the sleeve, as in FIG. 6, it is better if the screen and keyboard are aligned lengthwise. So it is desirable to have a Bi-Directional Screen.

There are many ways of doing this, including various techniques introduced here. One preferred version is a Detachable Screen (FIG. 2-B-1) with two Input Jacks (FIG. 26-3 & 5), one on a shorter side one on a longer side. An Electro Mechanical Hinge (EMH) (FIG. 26-7) carries electronic signals via a Thin Plug (FIG. 20-9), which can enter and connect to either of said Screen Jacks.

Said Thin Plug can have latching mechanisms (FIG. 26-11 & 13) to fix the Plug firmly inside the Jack, to avoid unintended detachment. Said Screen is capable of functioning in two alignments.

Thin Goggle

Tiny Screens with high resolution exist today. Some use Micro Electromechanical Mirrors (MEM) to project light onto the retina. But thin and pocket friendly goggles do not exist, as they encompass bulky ear attachments, forehead rests, and eye covers.

This section makes a thin and light Goggle to fit inside a pocket together with the rest of UMCC.

A thin long narrow rigid board (FIG. 23-B-1), called "Ruler", an Elastic Band (FIG. 23-B-3), having a Short Loop (FIG. 23-B-13) attached to said Ruler at certain point(s) (FIG. 23-B-15 & 17), and a Long Loop attached to said Ruler at certain points (FIG. 23-B-5 & 7), a tiny Goggle Screen (FIG. 23-B-9) connected to it via a Thin Electro-Mechanical Hinge (EMH) (FIG. 23-B-11), makes the desired Goggle.

FIG. 23-A shows the Short Loop of said Elastic Band stretching around Ear Base, holding it firmly, one tail end of the Ruler covers part of the ear, while the Long Loop stretches to pull the middle of the Ruler towards and against User's cheek, keeping it firmly in place.

Said Ruler can swivel around Ear Base, but stay firm in any desired position due to elastic force. Then said EMH keeps said eye Screen in required angle for aiming at the eye.

Ruler can be used also as a PCB to mount thin electronics on and carry PVF, RBF, etc. Pocket size Ruler length is sufficient to keep the eye Screen at required distance from eyes. Ruler's width can be less than pocket width, but a wider Ruler may have advantages in carrying some Memory, PVF, RBF or other layers.

Thin, Self Powered, Earpiece

To use UMCCs Speaker hands free, one way is to increase speaker volume, which often not practical. Another technique being developed is vibration via skin or bones to transfer sound to ears. Silent Microphones using neck or jawbone vibrations can also be incorporated. Earpiece is more practical.
   Current Earpieces have at least following disadvantages:
   Their speaker must be positioned inside the ear tunnel, irritating the ear
   They block ambient noise which are often necessary as feed-back and warning
   Their ear attachments, even though appear small, are not pocket friendly
   Some do not have an ear attachment, and easily fall off the ear
   Those with Mouthpiece are even bulkier
   Those with blue tooth, use a battery, adding to bulk and recharging issues
   Those with cable have messy cables and round bulky plugs
   They cannot conveniently fit into the same pocket with MCC (need a separate pocket)
   They are difficult to put on and off To avoid all said disadvantages and provide many advantages, Thin Earpiece is introduced.

FIG. 20 shows various views of Thin Earpiece. FIG. 20-A shows the cross section of a thin PCB (FIG. 20-A-1), or equivalent, having width and length substantially close to or smaller than that of a UMCC. On one surface of said PCB, a Speaker (FIG. 20A-7), Microphone(FIG. 20-A-9), Wireless & Electronics (FIG. 20-A-11), all chosen thin, are surface mounted in suitable locations for their functioning.

FIG. 20-B shows the working surface of said PCB, components numbered correspondingly to FIG. 20-A.

A flat donut shaped thin elastomer (FIG. 20-A-13) is adhered around said donut's outer rim (FIG. 20-A-15) to the working or ear side surface of said PCB, leaving the rest of donut and its inner rim (FIG. 20-A-17) free to lift away from said PCB, to hold User's ear firmly inside said elastomer donut. There can be one or more small (FIG. 20-A-19) to large (FIG. 20-B-21 & 23) openings, to allow some necessary ambient noise in and reduce ear sweating.

An optional thin, moisture absorbent, skin friendly, removable, dispensable or washable liner, spread over said PCB and under said Elastomer, where they touch the ear, makes said Earpiece friendlier.

A thin rechargeable Battery layer (FIG. 20-A-3) is adhered to the non-working surface of said PCB. Battery layer can be as wide and long as allowed for pocket portability and compatibility with UMCC. Alternatively a small thin battery can be placed on PCB (not a preferred option).

A thin Photo Voltaic Film (PVF) Pad (FIG. 20-C-5), compatible in width and length with associated UMCC, is adhered to said thin Battery as shown (FIG. 20-A-5).

PCB, Battery and PVF can each be sub-millimeter thick, requiring little external protective layers, as they support each other structurally, to make a rigid pad. Components on PCB can be less than 2 mm. Thus said Earpiece can be constructed less than 3 mm thick, but thicker if thicker layers are chosen.

One type of thin Speaker and Microphones are Piezoelectric, which can be sub millimeter.

FIG. 20-D shows the cross section of said Earpiece when off the ear, as the elastomer has retracted.

Figure 22:
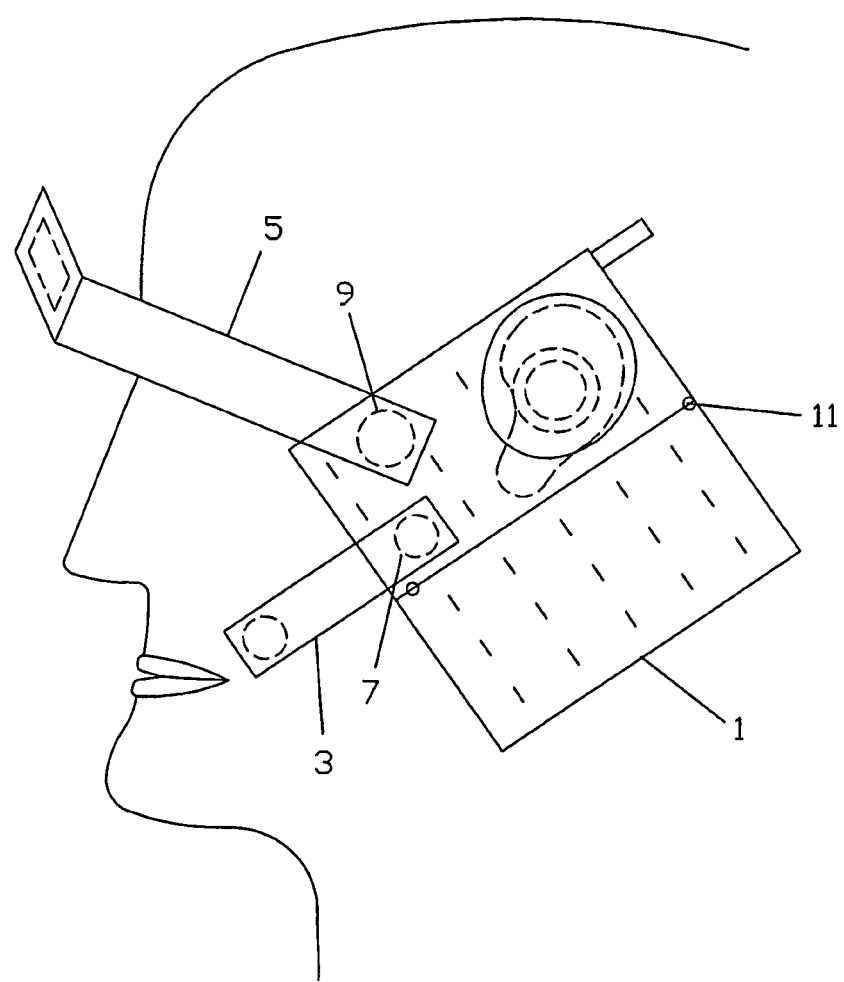

More PVF/RBF can be added to its side(s), folding over it or sliding inside it for transport (FIG. 22-1).

Thus a perfect self contained wireless or cable Thin Earpiece is constructed.

Said Earpiece can:
  have Thin Plugs and Thin Jacks (FIG. 20-B-33) for cable connection, if necessary.
  be long enough and swivel around ear base to bring its Microphone closer to mouth.
  attach to one surface of UMCC for Joints hand held use or transport.

Other Forms of Thin Earpiece

Many varieties of Earpiece can be designed, using the following elements introduced here:
  thin elastomers that stretch to engulf the ear firmly but slidingly, but retract to thin layers off ear
  thin rechargeable battery pads, thin photo voltaic pads and their combinations
  thin extension pads that can pivot around their attachment to the main body of the earpiece
  thin electronic components, spread over a larger surface, instead of bulkier electronic chips Other varieties can be constructed using some but not all of above elements. For example not using the Elastomer element, but conventional ear attachments, together with other elements above, will produce a novel thin Earpiece with own power generation and storage. Another example is using fuel cell or conventional battery for power, but Elastomer for ear attachment.

Some such variations are shown in FIGS. 21 & 22:

FIG. 21-A shows one variety of Thin Earpiece, having a small Speaker (FIG. 21-A-1), with a thin Jack (FIG. 21-A-3) inviting a thin Plug (FIG. 21-A-5), connected to cables (FIG. 21-A-7). It is suspended to ear by thin elastomer Band (FIG. 21-A-9) and an optional thin elastomer Loop (FIG. 21-A-11) for securer attachment to ear.

FIG. 21-B shows a narrower thin Earpiece, the elastomer part of which is larger than its PCB when enlarged to engulf the ears, but retracts to smaller size when off ear.

FIG. 22 shows a Thin Ear Piece, having an optional Extra PVF and or RBF (FIG. 22-1) or EGS which can fold over the main body of Thin Earpiece or slide inside it for transport, an optional extendable Mouthpiece (FIG. 22-3) which can swivel around its base (FIG. 22-7) and an optional Goggle Extension (FIG. 22-5) which can swivel around its base (FIG. 22-9).

Thin, Ear Borne, Self Powered, Cell Phone and or Radio

Adding thin Dials 0 to 9 (such as FIG. 20-B-25), thin Buttons (such as FIG. 20-B-27), Thin Folding Antenna (FIG. 20-B-29), and optional Small, Thin LCD or OLED Screen (FIG. 20-B-31), and choosing the Processor (FIG. 20-B-11) to have wide area wireless capabilities, preferably including Internet Phone, Thin Earpiece will be a Cell Phone. It can also become a Digital, Satellite or Wireless Internet Radio.

Said Cell phone can be thinner than 3 mm, ear borne or hand held, and pocket size, with own power.

As a UMCC Sub-Assembly, it can be attached to other Sub-Assemblies for more features. For example it can attach from one side to a thin Screen to make a cell hone with screen. Said Screen can fold over Thin Earpiece for transport.

An alternative to thin folding Antenna is an Antenna made of printed electronic traces on said PCB.

When necessary, a nearby neck or garment borne battery with cable and thin plug, adds power.

Thin, Ear borne, Self Powered, Music Player and or Video Player

Adding thin Flash or Equivalent types of Memory to said Thin Earpiece provides music storage. All other components are already there, if suitable Processor, Firmware and Drivers are adopted. Having larger, yet thin control buttons will help.

Adding Cell-Phone and or Radio capabilities, as detailed will enable wireless music downloading.

Having two of them, one for each ear, connected wirelessly or by cable across user's neck, makes a stereo music player, which has room for more power and memory.

Adding a preferably thin Goggle (FIG. 22-5) to one or both Earpieces, with suitable Processor and Drivers makes a Head Borne Video Player, considering that enough memory can be packed in a 1×60×120 mm layer. Alternatively, a hand, neck, garment or belt borne Screen can be used. Such a Music or Video Player can fit in one pocket, or be suspended from body or garments.

Add Wireless capabilities, and a hands free, pocket portable, thin TV is borne. Conventional head borne TVs are bulky and do not fit in pocket, as no attempt at making them thin has been made.

Better Hinges

In construction of UMCC, Hinges are used in many situations, examples of which are:
  A thin Pad, such as Screen, PVF, RBF, E-Pad, folds over or under UMCC Body or an adjacent Pad
  Antenna folds onto the thin ear piece (FIG. 20-B-29)
  Goggle Screen (FIG. 23-B-9) folds over the Ruler (FIG. 23-B-1), using a Hinge (FIG. 23-B-11)
  Screen (FIG. 26-1) folds over Keyboard (FIG. 26-15) using a Hinge (FIG. 26-7)
  PVF+RBF Pad (FIG. 22-1) folds over or under the Thin Earpiece via a Hinge (FIG. 22-11)

Such Hinges should have following properties to suit UMCC:

Be able to hold the folding pads firmly in desired angle against each other, so that PVF can face light or Screen can be fixed facing eyes, despite their leveraged weight, etc.

If necessary, Maintain Electronic Connectivity between folding Pads

Not be bulky, having an axis preferably less than 2 mm radius, ideally less than 1 mm radius, Otherwise combination of many hinges will add up to too much UMCC bulk Have a Tight Fold Radius, preferably below 2 mm, ideally below 1 mm like a V-Fold, as large U-Like Fold Radius can increase overall UMCC volume beyond pocket friendliness Despite Tight Fold Radius, the electronic connections between folding Pads should not break Conventional MCC folds, such as Screen Folding unto Keypad in Flip Phones, are large, having some 5 mm radius, which allows only one fold at one side of MCC, not one at each of 4 sides. One reason is that Flex circuits connecting adjacent PCBs cannot fold tightly, without breaking their circuits over time.

Here are new Mechanical and Electro-Mechanical Hinges (EMH), which deliver all above properties Rubber Mechanical Hinge (RMH)

Figure 13:
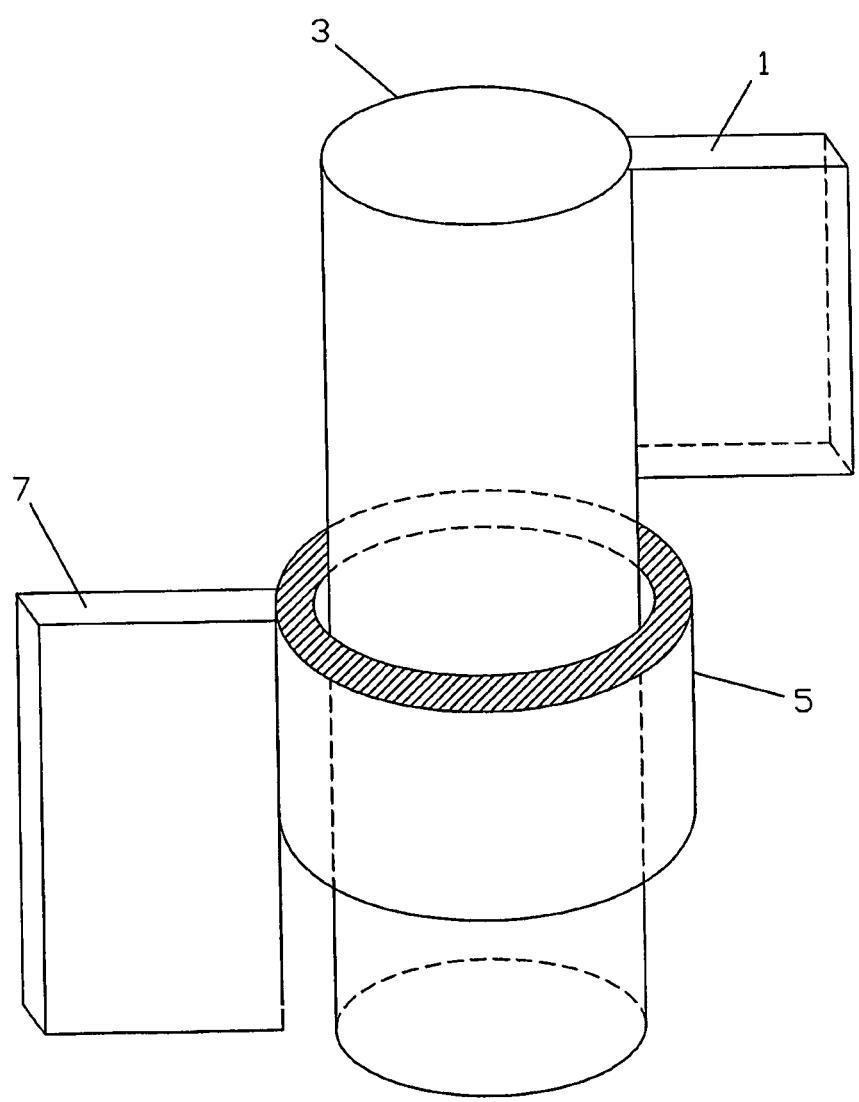

FIG. 13 shows a RMH, where one Pad (FIG. 13-1) is attached to a Rod (FIG. 13-3) with a circular cross section, running through a Rubber Ring (FIG. 13-5), which is attached to another Pad (FIG. 13-7). Said Rubber Ring is "stretched" when said Rod is inside it. Besides, its inner surface touching the Rod is constructed of non smooth material to provide grip. Thus all above properties, except electrical conductivity can be delivered. The Ring can be less than half mm thick, and the Rod can have less than half mm radius, adding to less than one mm radius for RMH. A number of such Single RMHs can be adjoint to make a Compound RMH. RMH has many uses outside UMCC, such as for folding Antennas which wear loose after some use, and for holding Desk LCDs in desired angle against the users eyes. If RMH is not confined by housing or adjacent components, ridges, grooves or other means of holding its components together should be added.

Acute Electronic Hinges (AEH)

Following three AEH are proposed, which are close enough to a V-Fold.

In 12-A, Cathodes 5 & 7 are connected to Anodes 9 & 11 respectively, each via one or more electronic traces 13 & 15, embedded in Flex Film 17. Traces are not perpendicular but angled against the axis of fold, to spread and increase their curve radius, without increasing the curve radius of flex.

Multiple traces connected crosswise for each cathode anode connection, ensure that even if some traces are broken in several points, overall electronic contact is maintained for longer. To provide controlled angle, a Mechanical Hinge, preferably RMH 19 is used.

B—FIG. 12-B shows pads 1 & 3 electronically connected via Conductive Rubber or Conductive Polymer Bands, enabling a tight fold. MH or RMH 11 is used for angular fixation and control.

C—FIG. 12-C shows Pads 1 having cathodes 5,7,9 connected to Pad 3 Anodes 11,13,15, via thin bundled cables stretching across the gap 17 between said Pads. MH or RMH 17 & 19 give angular control.

Electro Mechanical Hinge (EMH)

Type A—

In FIG. 14, Pad 14-A-1 is connected physically and electronically to conductive rigid Element of crescent cross section 14-A-3, which element enters Rubber Ring 14-B-9 from one end, while Pad 14-C-5 is connected to a conductive rigid Rod of circular cross section 14-A-7, which enters said Rubber Ring from the other end, such said Rod and Element are in contact and pressed together by said Rubber Ring, stretched radially (not longitudinally). FIG. 14-D shows the EMH cross section.

Type B—

FIG. 15-A shows Pad 1 electronically connected to rigid element 3 through traces that go through Rubber Ring 9. Similarly, Pad 5 is connected to element 7, via traces that go through Rubber Ring 11. A conductive rigid Rod 13 runs trough both said Rubber Rings, stretching both of them radially. As the cross section 15-B shows, electrons can go from Pad 1 to Element 3 to Rod 13 to Element 7 to Pad 5.

Applicable to Both EMH Types A & B Above:

Each electronic contact between Pads 1 & 5 would require one such Single EMH.

A Single EMH can revolve Pads against each other beyond 360 degrees, many revolutions A number of adjacent Single EMH can make a Compound EMH, to connect multiple electronic pairs. Each segment of the Rod is electronically separated from other segments by non conductive segments (FIG. 15-A-15 & 17) to prevent unintended contact between adjacent Single EMHs.

All components can be sub millimeter in size, hence EMH can be below 2 mm or even 1 mm radius.

If Conductive Rubber is used, crescent cross section Elements can be eliminated

Same technology can be used without electricity conduction, to make Mechanical Hinges, with universal applications and for UMCC If necessary, grooves, ridges or other means of keeping EMH components together should be added. For example, some Rod Segments (FIG. 15-A & 17) can have larger radius for such effect.

Better Electro Mechanical Swivels (EMS)

UMCC also uses Swivels, examples being:

Mouthpiece (FIG. 22-3) swivel around its base (FIG. 22-7)

Goggle Arm (FIG. 22-5) swivel around its base (FIG. 22-9)

Swivels should be able to:

Provide electronic connectivity between swiveling pads

Hold swiveling pads in desired firmly position

Do above without adding too much thickness, bulk or components

This application introduces light, thin, simple Swivels, applicable beyond electronics too.

EMS—Type A (FIG. 18)

In 18-A, Pads 1 & 3 swivel around Axis 5, running from Pad 3 through Pad 1 and Rubber Pill 9 to Rigid Coin 7. Rubber Pill is compressed due to short distance between Rigid Coin and Pad 3, thus pressing electronic Traces 11 & 13 on Pad 1 against corresponding Traces 15 & 19 respectively. Thus Pads can be swivel and be held at desired position against each other while electronic connectivity is maintained buy arc traces 11, 13, 15, 17 in FIG. 18-B, which are in firm contact due to Rubber Pill.

EMS—Type B (FIG. 19)

In FIG. 19, Pad 1 swivels over Pad 3 around Axis 5, running from Pad 3 through Rubber Pill 9, through Pad 1 to Rigid Coin 7, such that Rubber Pill is compressed, providing angular or positional control.

Contact points 11, 13, 15 on Pad 1 are connected electronically to corresponding points 17, 19, 21 respectively on Pad 3, via cables, having sufficient length and flexibility to allow required swivel range.

Applicable to both A & B types of EMS:
All layers can be sub millimeter thick, adding to less than 3 or even 2 mm overall thickness of EMS.
A number of Single EMSs can be aligned to make a Compound EMS.
Even without electrical connections, EMS will be a useful Single or Compound Mechanical Swivel, not just for thin Pads but for all forms of adjacent moving parts and beyond electronics applications.
Same technology of using Compressed Rubber Pills or Rings between adjacent moving parts to create controllable friction and firmly holding them together at desired angle can be used to create Single or Compound Mechanical Swivels and or Hinges with universal applications.

Better Electro Mechanical Pivot (EMP)

Two adjacent Pads can move around a joint point (not a joint side), using a Pivot.

Figure 16:
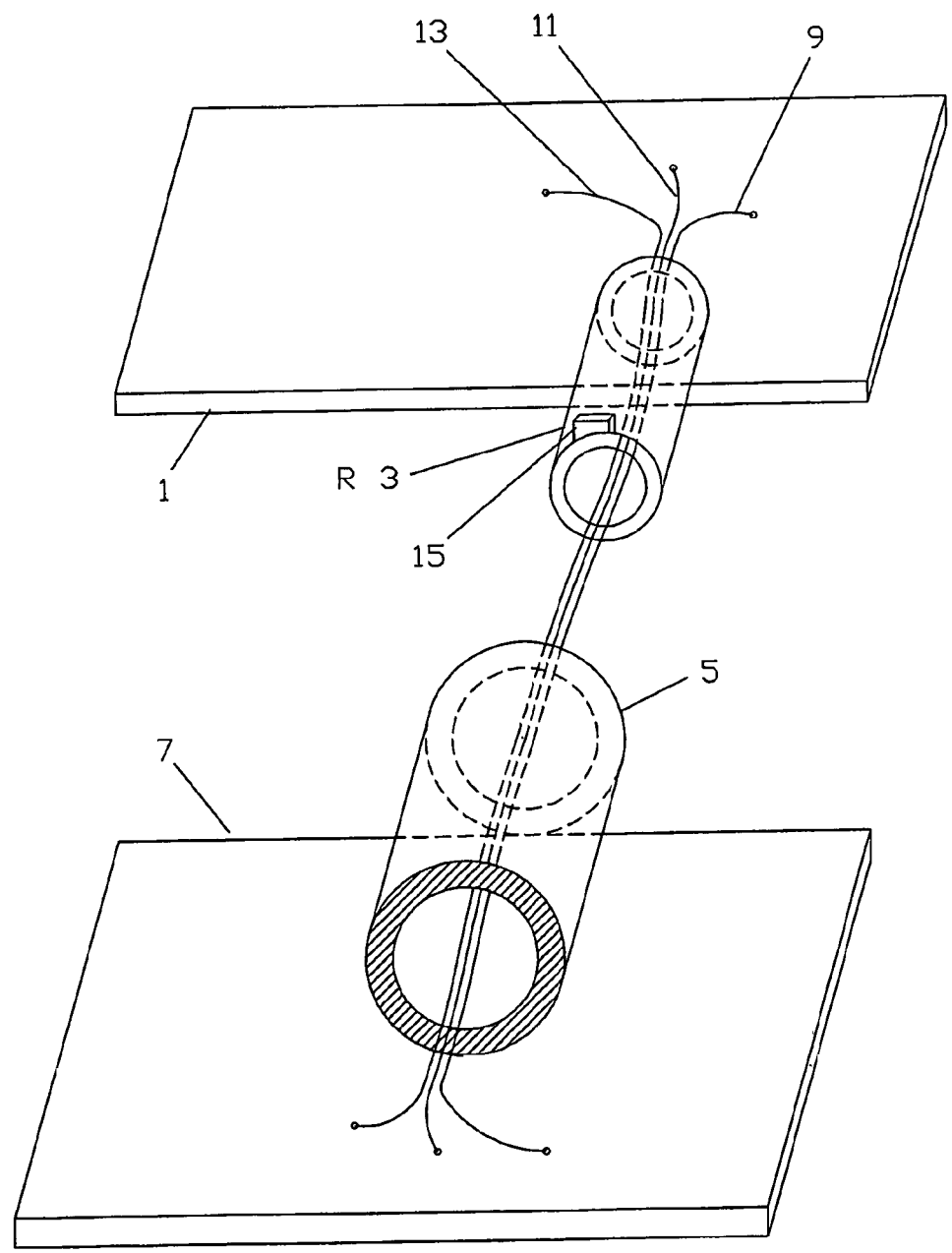

For UMCC and other universal applications, a Pivot should be able to:
hold said Pads firmly against each other at desired angle, yet let them rotate when desired
carry a number of electrical connections between them if and where desired
be thin and small, with dimensions preferably below 4 mm, ideally below 2 mm FIG. 16 shows a EMP between Pad 1 with a rigid Rod 3, which when assembled will be inside radially Stretched Rubber Ring 5 on Pad 7.

If said Rod is Tubular, cables 9, 11, 13 running through said Tube conduct electricity between Pads. Even more than 360 degree pivoting is possible, but if said Pivot also carries electrical cables, rotation is limited to cables twisting limits.

Said Pivot has universal application and can be larger, with or without electro cables. It need not only connect PCBs but also other electronic or general components.

Conventional pivots use metal friction which smoothes after some use, while said Rubber Ring will shrink to hold its grip.

If necessary, a Bump 15 which snaps out of said Ring when said Tube or Rod is fully inside said Ring, will prevent said Rod or Tube from sliding out of said Ring.

Thin and or Foldable Antenna

Antennas are conventionally thick, round and tall, adding some awkward 30 mm to MCC height. For heavier duties such as broad-band or Wi-Max, longer antennas are preferred. Conventional folding antennas use metal friction for firmness of folding and telescopic joints, which loose grip over time.

This Application introduces Trace Antenna, as traces of metal imbedded in UMCC Shell or Jacket. Alternatively those traces can be on a fraction of millimeter thin Flex or equivalent sheet to be adhered to the outside of Shell or Inside of Jacket.

This Application also introduces PCB Antenna, being a rigid PCB or equivalent, sub-millimeter thick, preferably less than 10 mm wide, and up to UMCC length, many times that of a cell phone antenna.

PCB antenna is connected to UMCC or one of UMCC Sub-Assemblies, especially the Thin Cell phone, via a thin Electro Mechanical Hinge, preferably those introduced separately here, to unfold or rise when in use and to fold or fall alongside UMCC for transport.

Electro Mechanical Universal Joint (EMUJ)

Figure 17:
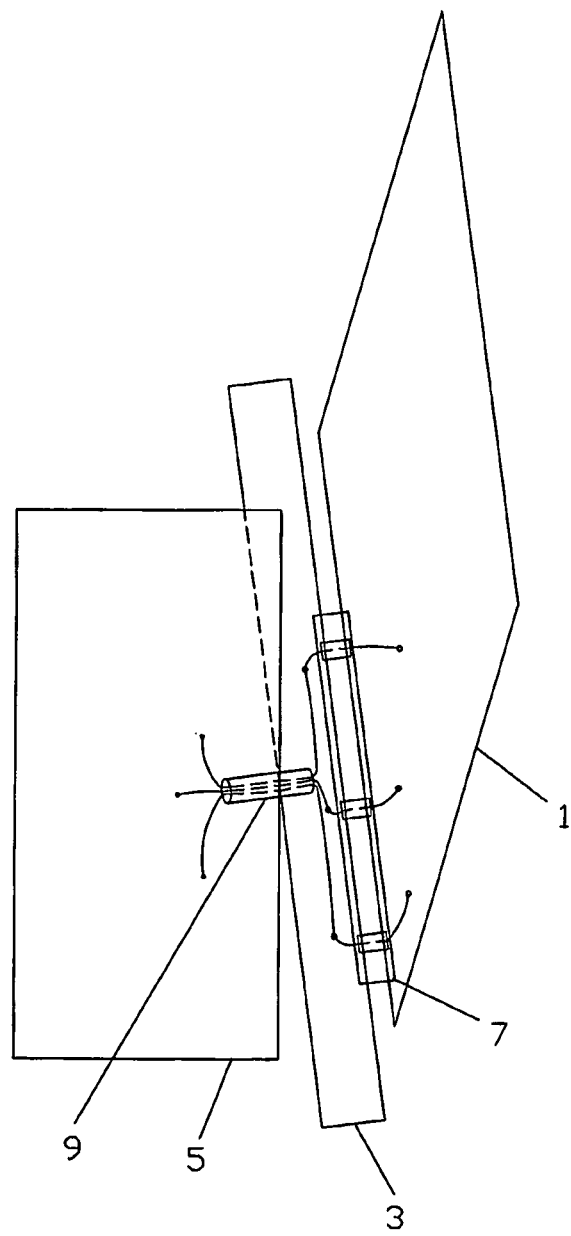

FIG. 17 shows a EMUJ where Pad 1 is connected via Electro Mechanical Hinge 7 to a rigid Strip 3, which is connected to Pad 5 via Electro Mechanical Pivot 9. Such combination of EMH & EMP enables Pads 1 & 5 to rotate against each other in all 3 dimensions and if required, communicate a number of electronic traces between them.

Said Strip can be thin and narrow, below 2 or even 1 mm, so that EMUJ does not cause undue bulk.

EMUJ has universal applications, with or without electro cables and can be of larger size.

Thin Connectors, Plugs and Jacks and Electro Mechanical Slides (FIG. 25)

Conventional designs are typically round and bulky, which is one obstacle in making devices small.

This application uses blade shaped Thin Plugs and Connectors (male element) and corresponding Narrow Jacks (female element) in UMCC, not typically used in MCCs.

We propose using Thin Rubber in said elements, to provide contact pressure and frictional grip, instead of "springs" used conventionally, so as to reduce thickness and durability.

We also propose using Rubber, instead of conventional springs, between Pads which are connected Mechanically and or Electronically by a Slide or Drawer mechanism, to provide grip and electro contact pressure, thus reducing assembled thickness and durability for same or better function.

FIG. 25-A shows a Thin Plug with a Thin Cable 5, a Thin Handle 3, and Thin blade shape Male, having conductive Trace(s) 15, meant to enter and be fixed into the Female 9 of a Thin Jack.

FIG. 25-B shows a Thin Jack installed on a PCB or Equivalent 7, on which and inside its Thin gap shaped Female 9, there are conductive Trace(s) to contact with corresponding Plug Trace(s).

Pressure to hold Jack and Plug Traces firm enough for electrical conductivity, and also the Grip to hold the Jack physically firmly inside the Female is provided by a Thin Rubber Layer 11, which is compressed between said Male and a rigid Shell 13.

In conventional plugs, said Shell is often a solid, non stretch, non conductive polymer, but the task performed by our proposed Rubber is conventionally done by metal springs, which are bulkier, do not have as much frictional grip as rubber, and loose their pressure and grip over time.

FIG. 25-C shows a cross section of a Thin Electro-Mechanical Slide, having two PCBs or Equivalents 17 & 19, with electronic Trace(s) 21 & 23, pressed against each other by a thin Rubber Stripe 27, which Stripe is compressed by a mechanism such as U-Clamp 29 which may be part of UMCC Shell, or L-Clamp as one or both PCB(s), or equivalent mechanism.

Conventionally, Contact Pressure and Grip for EMS is provided by metal springs, not rubber.

Adding New Capabilities to UMCC

This application introduces new capabilities made possible by UMCC key features, detailed separately. Such capabilities are impractical in conventional MCCs, even if some are theoretically feasible. Some UMCC features make such new capabilities Possible, or Practical or Friendly.

Of particular importance are having a good keyboard, hands free carrying and operation, being ready to use and being comprehensive to eliminate carrying of multiple other devices.

Following capabilities can be added to current Cell Phones, PDAs, Smart Phones, Pocket PCs, etc.

Also, custom Devices to perform one or more of such capabilities can be made. Instead of "adding", capabilities, UMCC can be modified or custom made for them, even by not including some capabilities in excess of customized requirements.

Portable Talking Machine (PTM) (For Speech Challenged)

Speech challenged persons currently use sign language, which is understood by few and has limited vocabulary and syntax Adding available Text to Speech software to UMCC, a Speech Challenged can type what she wants to say, to be spoken via UMCC Speaker.

Alternatively typed text can be viewed by Audience facing the User, by having UMCC suspended from Users neck or belt, fixing the Screen at an angle suitable for viewing by User and Audience, for example 45 degrees to Users body, and activating an available Screen rotation software that turns the text upward even though the Screen is upside down. In this case User has to get used to reading her own tying upside down.

An alternative is to have the Screen suspended above the keyboard facing the Audience upward. In such case user should get used to not seeing her typed text, unless a thin mirror is placed suitably to reflect the screen for users view.

Monitoring and Editing of text can be done by use of a second Screen, or a Goggle or Earpiece. Release after editing can be passive, i.e. release until stopped for editing. Active release can be done by editing then pressing a key such as "Enter".

A fast keyboard makes this capability Possible. Other UMCC features, such as wearability, being ready to use, screen facing the audience, etc. make it Practical and User Friendly.

Translator

Adding available translating software to UMCC, enables User to type what she wants in her language, to be translated to another, then either seen on the Screen as in Portable Talking Machine, or spoken by the Speaker. This is made possible by UMCC fast keyboard, and made practical by wearability, screen viewable by audience, and other features.

An alternative is User talking into UMCC Microphone, to be converted to text by available Speech Recognition software, to be heard or viewed by audience.

Editing can be provided as in Potable Talking Machine detailed elsewhere.

Conversation in noisy or silent places is done by typing to screen, with or without translating.

E-Ear

Deaf people can be helped by UMCC in following ways:
A—Talker types on Dears UMCC for Deaf's viewing
B—Talker types on her own UMCC to be transmitted to Deaf's UMCC for viewing
C—Talker's voice is picked up by Deaf's UMCC Microphone, converted to text by available Speech Recognition software, to be viewed by Deaf on the Screen. Available Voice Filtering techniques can be utilized to reduce inaccuracies.
D—Talker's voice is converted to text by her UMCC and transmitted to Dears UMCC Screen A & C are made practical by UMCC Fast Keyboard. A, B, C & D are made practical by wearability, ready to use, hands free operation, etc.

Deaf can also attach a device being developed, to translates digitized voice or text into vibrations, which become comprehendible with practice.

Sense Converter

Digitized data can be Realized by any Realizer. For example, Sound digitized by Microphone, normally realized by Speaker, can also be Printed, viewed on Screen or sent to Vibrator.

This versatility can easily be used to make Sense Converters to assist people with disabilities. Providing a Vibrator to Realize digitized Sound will enable the Deaf to make some sense of Sound. UMCC can be programmed to Realize digitized Sound not by Speaker, but by Vibrator.

Another example is enabling some elderly who cannot smell, to add a Smell Digitizer to UMCC, then read on its Screen the smell of a food.

Numerous other configurations can be made to assist the Blind, Speech Challenged or others.

SOS

SOS software, activated by one or more buttons or keys can initiate a series of tasks such as:
 capture pictures and video clips of any assailant or criminal and surroundings
 transmit them to some monitoring station, with location calculated by GPS or otherwise
 shout prerecorded warnings that the criminals video is already in police files
 call or email friends, family and other relevant parties, perhaps with prerecorded messages
 transmit time and all relevant personal details, including the victims looks and outfit last captured by UMCC camera
 sound a siren
 other tasks if desired Camera can have flash and or night vision. It can have a portable ad-on that can capture criminal's breath molecules, digitize some of its chemical characteristics, even DNA, for instant transmission.

Available electric skin can capture and transmit the criminal's fingerprint, if he attempts to touch the UMCC to take it away.

SOS is made practical by UMCC being easily and practically wearable and ready to use. UMCC can be is and is likely always worn, facing away from User, ready to capture. It is usually too late if User has to pull a device out of pocket, open it, turn it on and point at crime scene, especially that under attack, many people loose initiative.

SOS feature can especially help battered women, bullied children, visitors to dangerous areas, those dragged, often unwillingly to gang or school fights, etc., markedly reducing crime.

Warning devices have been attempted before, but none has become popular, some reasons being:
 users do not perceive risk as high as bothering to buy and always carry them
 they only perform one task, say siren, not many of useful tasks described above
 users have more important devices such as cell phone to carry, leaving no (mental) room
 many must be in pocket, which is not always possible, and also slow to use
 it is not cool to be scared, especially for teenagers most at risk of bully and fights All above obstacles for carrying such devices are resolved by SOS, as users already carry an UMCC or MCC for a good cool reason, no need for a pocket, no one has to know it has SOS feature, it can perform many desired emergency tasks, not just a few, etc.

SOS can also be added to today's cell phones, PDAs, pocket computers, other even larger devices.

Computer Remote Control (CRC)

CRC capability is achieved by suitable software to correlate UMCC and Desktop Screens, so that what is seen on one is the same as the other, even though with different resolution. In the main part, UMCC keyboard, screen and wireless are used, as processing power is used by desktop. This capability would be impractical without a proper fast keyboard in UMCC.

Multi Party Games (MPG)

As UMCC Screen can be viewable by other players, having a second screen or goggle or earpiece as the game requires and using wireless for communicating with other players, a MPG is made.

E-Board can have one or more keys that act like a Mouse, and one or more keys acting like Scroll.

An available wireless Joystick, converting an E-Pad to perform as a Joystick, can be added. An E-Pad with one or more larger Mouse & or Scroll keys programmed as Joystick can be added.

Pocket Musical Keyboard (PMK)

Assigning musical notes to keys and adding a music synthesizer, would make a PMK. PMK is not practical with those tiny hard keys or with a separate deskbound keyboard.

E. Meal

A custom UMCC, called E-Meal can automate much of restaurant work. One simple version comprises a simple Keypad+thin and or small battery, preferably Rechargeable Battery Film+preferably a Photo Voltaic Film+short range Wireless, such as Blue Tooth.

One or more E-Meal(s) can be supplied for each Table, preferably one for each Chair, preferably adhered, cabled or chained to Table or Chair, preferably together with a suitably rugged Menu.

Patrons enter their Table Number and Menu's Food Number, for transmission to Kitchen Computer. Patrons can also call a Waiter by entering a Code, rather than waiting to be seen by one.

More components, preferably all thin and rugged plus suitable Processor, Memory and Software, increase E-Meal utility, for example:

A Screen can show the Menu, stored in E-Meal or Kitchen Computer, in which case Menu can change frequently, have more details and pictures of every item, even video clips of how prepared, even where the ingredients are grown.

Hence food can even be ordered from outside restaurant, using Patron's own UMCC, to be ready for delivery, take away or in-house consumption.

Payment can also be processed via UMCC, by Credit Card or Patrons Restaurant Account. Bills can be prepared for those paying together, perhaps more than one per Table.

A computer at the entrance can show which Tables are ready or soon to be ready, allowing Patrons to seat themselves.

Patrons can instantly communicate with Kitchen, for questions and orders, by voice and or video and even watch the Kitchen for sanitary confirmation or fun.

Above features can be added to current pocket computer's, cell phones, laptops, tablets and PCs.

This application proposes suitable Software for MCCs, UMCCs and Restaurants for said Processes.

A UMCC Data Processing Method

MCCs have evolved from miniaturization of computers, sophistication of cell phones and addition of various hardware such as camera.

There are many different and often conflicting Protocols defining relations between functions.

The word Multi-Media is coined to address many capabilities, which adds to complexity.

To simplify understanding, standardization, manufacturing and data processing, both Intra UMCC or Inter UMCC, we introduce "Uni-Media Protocol".

Instead of thinking of all various Input/Output devices as Multi Media, we define all Inputs as Digitizers and all Outputs as Realizers.

Each Digitizer adds a "type identification code" to digitized data, such as "010" for Text, 001 for Sound. Said code is either applied to the circuit carrying the data (say all data carried by a particular telephone circuit over a specified time is regarded as Sound) or at the beginning of a stream of data to apply to all data following it, until the next code appears, or added to each packet of data.

A preferred option is to add said data to each "Internet Protocol Packet" of data, close to packet destination address, as most data are processed and transmitted using Internet Protocol.

Once said data is received by any other device, it can be identified, processed accordingly and especially Output by corresponding Realizer, say packets labeled 001 will be output by Speaker.

Generalizations

E—UMCC can be made by many permutations and combinations of parts. Even though a preferred version is used in the description, all UMCC variations are included.

F—Most means, gears, devices, gadgets, techniques, methods and systems introduced here apply also to lap top, note book and tablet computers. Some also to desk tops and to other devices such as digital cameras, and to networks such as the Internet.

G—Many technologies introduced here have universal applications beyond UMCC or Electronics.

H—One or more preferred technologies as solutions to each problems or issues are introduced. UMCC can use conventional solutions in addition to ours, maintaining underlying concept.

I—Not adding such generalization clauses at the point of describing a technology does not mean such generalizations do not apply.

Further Elaborations: (On Mentioned Topics)

Title: An Alternative, Perhaps Better Title is "Ultra Mobile Omni Purpose Computer"

UMCC Jacket,

The Jacket, which we may also be called the "Vest", need not be confined to the main body of UMCC, but can encase attached components, especially the Screen, mainly on the exposed side, obviously with openings to allow operation.

Said Vest need not have openings for all Buttons or Keys, as many may be operable even though covered by the Vest, especially if the Vest is Flexible and better Translucent over such Buttons or Keys.

If the Vest or one layer making it is made of Electro Conductive Material (the Rubber version exists), it will also serve as Electro Magnetic Radiation Shield, especially if UMCC Antenna is imbedded its housing or for protruding Antennas, if the Vest is extended to Shield the body parts.

The UMCC Elastomer Shell, with a "stiffer" inner layer need not be stiff throughout its inner layer, so long as stiffness is over UMCC inner components that may be damaged if covered only by a flexible Shell. One Preferred version is a Shell with a Net of stiff thin wires or fibers(such as glass fiber), were protection is needed, hence protective yet Elastomeric, even perhaps Dense Foam, to make the shell light and soft.

The Jacket need not be Elastomeric to have fins, tails, tongues, tail pockets, holes, belt slits (collectively referred to here as "Anchors"), for gears such as suspension pads, pant hooks, garment hooks, safety pins, belt loops, head band, wrist band, shoulder strap, etc., for attaching UMCC to neck, wrist, head, garment, belt, shoulder, etc. (collectively referred to here as "Latches"), but may be a thin rigid martial such as metal, plastic or other, even with rigid Anchors, which if need to pivot, would use a standard hinging mechanism, instead of relying on flexibility to pivot or hinge.

Also a UMCC Shell, rigid or soft, can be designed to have Rigid or Flexible Anchors and/or Latches.

In both Rigid and Non-Rigid Vests and Shells, said Anchors can be made of flexible or rigid material. Anchors, Pads, Hooks, Pins, Loops, etc. can be Fixed or Detachable, and that there may be more than one of each for each Vest.

For example there can be more than one Jacket Tail in various configurations, such as side by side, face to back, stacked on same or different side(s) of the Jacket, each carrying some or all of the Jacket Tail Holes or Pocket(s).

One major advantage of having an Eastover or otherwise soft Outer Shell or Vest is making the UMCC be or look more drop and knock resistant, allowing care free handling.

UMCC Keyboard (E-Board)

Since E-Board is Thin, it can be attached to any rigid support surface. Detached or External versions and the Integral or Attached versions not supported by the body of UMCC or MCC incorporate a rigid layer in their construction for support off the desk.

E-Board need not have such a rigid layer if support is provided by resting on a rigid part of UMCC or MCC, be it the main body or the side attachments, such as a thin flat rigid battery pad on a side of UMCC/MCC.

For use without looking at keys, E-Board better have key markings that are "raised" or "etched". Also an E-Board with dipped "bowl" keys resembling a Honeycomb suits blind typing.

Omni UMCC

Custom UMCCs using lesser or minimal configurations for their main function, can produce the important advantage of relying entirely on Photo Voltaic Cell, perhaps combined with Rechargeable Battery Film or conventional battery.

An example is the E-Meal Electronic Menu which can be configured, even with a basic OLED Screen not to need external power. No need to charge numerous menus in a restaurant gives major convenience, cost saving and reduces customer dissatisfaction due to inoperative e-menus. Hence even though UMCC can be Multi-functional, it sometimes makes sense to reduce functions.

SOS

SOS capability can be incorporated into conventional MCCs via Software.

Even if PDA, Cell phone or UMCC is not wireless enabled, it can serve to capture an assailants picture, voice and perhaps location if GPS enables, perhaps a short note by the Victim. Then one possibility is to throw the Device away from the assailant to a nearby location, or even roadside from a hijacking car, hopefully forcing the assailant to change routine to retrieve it or give up.

For wireless MCCs and UMCCs with SOS Feature, Carriers, Security firms, Watch Groups, Parents, Police, or Specialized companies, can provide SOS Service. Assailant's Voice, Picture, Video Clip, Location, and other Data such as Victim's Note can be transmitted to said Provider, who will Save all, and transmit to Police, Security Service, Victim's pre-identified relatives and or friends, for action.

This System can be modified to serve Omni Present (even Freelance) Reporters for Instant Capture and Transmit ion of newsworthy events to suitably programmed Media, such as the Internet.

Sense Converter

Another example is a Speech to Text firmware or device as Digitizer converting a speaker's speech to text, can be sensed by A Deaf and Blind person via a preferably portable Brail Device as Realizer. The general idea is converting any media to the media consumable by a category of disability.

Portable Talking Machine—also referred to as "E-Speech"

One method of Editing of Text prior to Audience viewing is to use available Screen Rotation Software. The Screen is viewable by User and Audience. While typing, the Text appears in a direction suitable for Users reading (say top of each letter is towards the top of the Screen, which may be at a lower horizontal level than the bottom of the Screen as the Screen may be angled down), hence difficult for the Audience to read as it is upside down to them. Once edited for release, each piece of Text is rotated upside down, by pressing a key, for use by the Audience. This eliminates any need for extra Screen, Mirror or other Components needed for editing.

Another is to have the Text inaccessible to Audience, say by having the screen facing the User, then use the Text to Speech and Speaker for hearing Audience.

Various Methods and Flavours of Text to Speech, such as different languages, accents, notions such as cry, laugh, shout, symbols to better explain feelings or expressions than text can, etc. can be incorporated in the Mobile Talking Machine.

E-Speech allows public speech, even from pre typed text, even reading to an audience via a Scanner to convert text from a page to Text, and in turn to Speech.

E-Speech also allows augmentation of Speech with Graphs and Pictures.

E-Speech, being a type of UMCC can be Hand Held as well as carried in other forms.

E-Speech, comprising only of E-Board and Text to Speech firmware and (say paeseo-electric) Speaker, even with a OLED Screen for text would run on one or few PVF or EGS, without heavy and/or going flat battery.

E-Speech Ultra Mobility, Hands Free Carrying, One Hand Free even while typing resolves all issues.

Note that Desk Talking Machine only have limited use at home or special schools. Even a hand held one is a menace, as User must hold it all the time, unlike a PDA used a number of times per day.

Many existing conventional devices have proved unpopular because unlike UMCC, they are not Both Hands Free for Carrying, One Hand Free in Operation or lack other UMCC features.

A Custom Made "E-Speech", Also Called "E-Talk"

Figure 33:
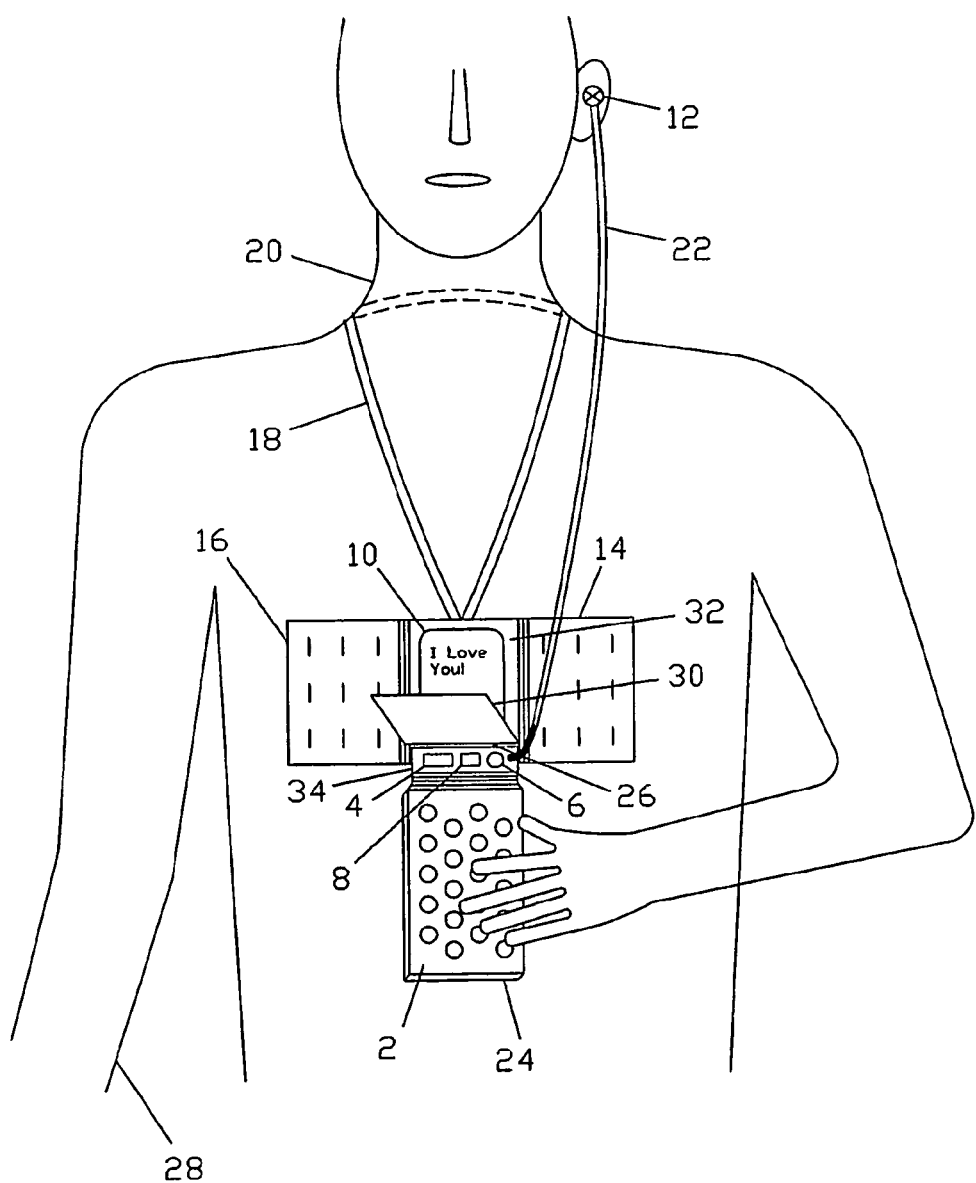

FIG. 33 is described by describing a more comprehensive preferred version of E-Talk.

A left hand operated Keyboard (2) is attached to an Electronics Board (34) which holds some or all of the Electronics (4), Speaker (6), Wireless Communicator (8), Screen (10). Screen Housing (32) is also attached on left and right sides to Photo-Cell panels (14 & 16). A thin (e.g. Polymer) rechargeable Battery (24) is attached to the underside of the Keyboard and for the Photo-cell panel(s) and/or preferably the Screen Housing.

A necklace Band (18) suspends E-Talk from User's neck (20). A thin electronic or Mirror Monitor (30) is hinged to the Screen Housing such that it can stay at an angle that enables the User to see what is typed by looking down, for feedback.

An optional and Detachable Earphone (12) is connected by Cables (22) to the Electronics Board.

Photo-cell panels (14 &16) can fold over the Screen Housing when not used.

Photo-cell panels can also be made detachable if not needed for periods of time.

The Keyboard can also fold over the Screen Housing, when not in Use.

The Monitor is hinged firmly so as to stay in desired manually adjustable angle with the Screen. Hence it can fold over the Screen when E-Talk not used.

The Keyboard, some of the Electronics, the Speaker and optionally the Wireless Communicator and for the Earphone can be made detachable from the Screen Housing, from the snap on/off Junction (26), so that the Detached components form a simpler E-Talk, for easier use and mobility.

Such detached sub-assembly should have its small or thin Battery (24).

For said detachment to function better, one of the Photocell panels should be attached to its right side, so that when detached, it has its own Power Supply.

A right-hand User, having the right hand (28) free, uses the left hand to type "I Love You!", which can be heard by the audience via the Speaker, after conversion to speech by Speech Synthesizer, and/or seen on the Screen.

All components can be made Detachable and or have on/off switches.

For editing typed text prior to letting the audience see or hear it, User can activate a delayed release mechanism, to delay transfer to Speaker or the Screen, then either use the Earphone to hear or the Monitor to see his/her input, edit if necessary, before releasing to the Screen and/or the Speaker.

Mirror type Monitor should be kept at an angle which lets the User, but not the audience see the Screen, to be adjusted manually, after any editing, to let the audience see the Screen.
Other Variations of UMCC and its Add-Ons
Hands Free Carrying of UMCC The Suspension Pad in FIG. 2 need not be rectangular. It can have the shape in FIG. 31-A, narrower than UMCC width, having optional Ear(s) 31-A-1 & 31-A-2. Corresponding UMCC Jacket or Shell FIG. 31-B-1, having a Tail FIG. 31-B-2, which may be detached from other Jacket Tails FIG. 31-B-3 & 4, having cavities FIG. 31-B-5 & 6 into which the Suspension Pad's Ears latch, to prevent unintentional release of said Pad form said Jacket or Shell, yet can be removed.

Such a narrower Suspension Pad can more easily be inserted behind Users Belt for UMCC carrying, accommodating UMCC operation without dislodging from the belt, by lifting the UMCC body to face the operator, leaving the Pad behind the belt, and finally easy removal of UMCC and Suspension pad from users belt, when UMCC not needed.

The suspension Pad, can also be used to suspend the UMCC from any Garment Slit or Garment Loop that may be added to Garments (similar to slit or loop for holding flowers), or even Watch Wrist Band.

Also, if a suitably sized (safety Pin), such as the Safety Pin introduced here (FIG. 2-D) is attached to garment at two extremes, the Suspension Pad can be inserted between the Pin and the Garment, holding the UMCC for Hands Free Carrying & Operation.

UMCC Suspension Pad in FIG. 31-C is designed with a narrower width to enter the Shell or Jacket Tail Pocket (FIG. 31-B-2), avoid other Pockets (FIG. 31-B-3 & 4). The rest of it is wider to hold better inside Pants or Swimming Suit, etc.

Suspension Pad can rest under the UMCC body, adding only sub-millimeter thickness and negligible weight, for conventional hand held use or pocket stowage.

Figure 27:
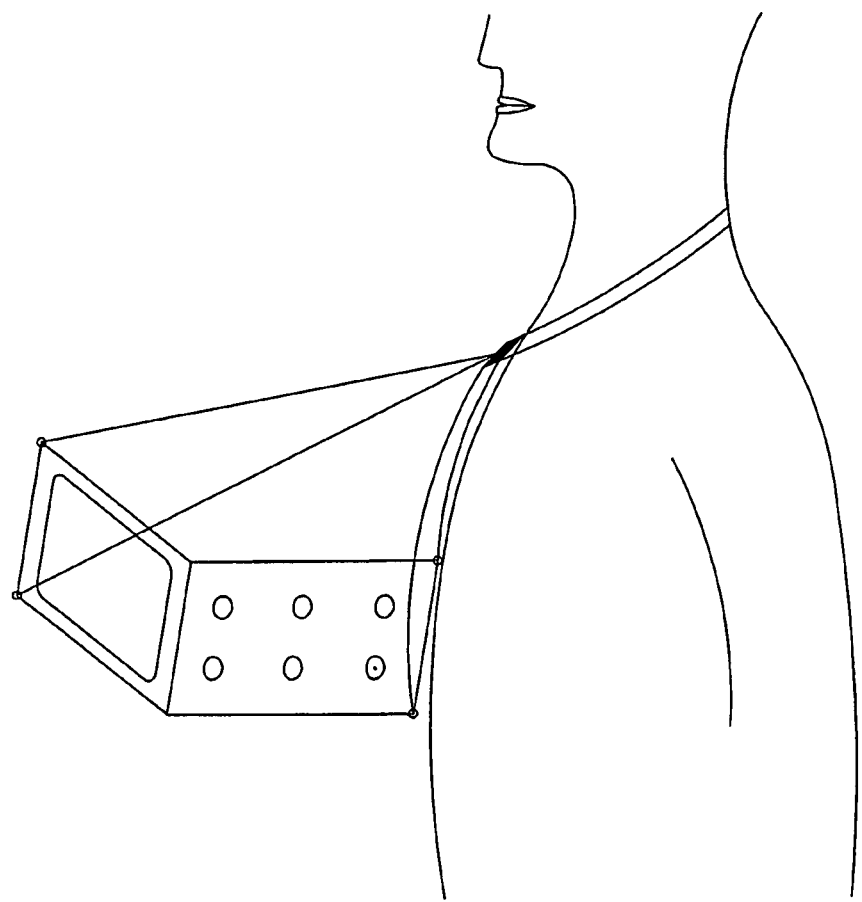
FIG. 27—a UMCC held in operative position by a Neckband String attached to its screen module
FIG. 28—hands free UMCC Operational Support Pad and Mechanism
FIG. 29—Flip UMCC with Dents for easier Hand Grip
FIG. 30—Mini Notebook UMCC, with Hand Grip Holes or palm/wrist Strap
FIG. 31—other variations of UMCC Suspension Pad and attachment
FIG. 32—other variations of Mechanical and Electro Mechanical Hinges
FIG. 33—a custom Portable Talking Machine for Speech Challenged, called E—Speech or E—Talk

Suspension Pad (FIG. 2-A) shows (say) four Holes that can be used to attach it more firmly, yet removable in the Jacket Tail Pocket FIG. 1-27), by running a string or double sided tack through said holes and corresponding holes in the Jacket Tail.
Hands Free Operational Support Neckband String FIG. 27 shows a method of keeping UMCC in typing and viewing position, using Neckband String attaching to the top of the Screen "module". This requires the Hinge between Screen "module" and the Main Body "module", to be firm(ed) for operation not to fold under typing pressure alone. We have introduced a number of such Hinges. Conventional means can also be used.

UMCC Support Pad: (FIG. 28-A) shows a Thin, preferably Sub-Millimeter Rigid Pad (FIG. 28-A-1), connected on one, typically shorter side, via a Foldable Strip (FIG. 28-A-2) to a thin Eastover Loop (FIG. 28-A-3). Its opposite side (FIG. 28-A-4) is removably or permanently anchored to the underside of UMCC Body module, pivoting along the side of UMCC opposite to the UMCC side which anchors UMCC Suspension Pad. For such anchoring, Support Pad can use conventional or means introduced in this application, such as those for anchoring Suspension Pad (say another Jacket Tail Pocket). The Suspension Pad's side opposite to SP's anchored side runs through said Eastover Loop.

When UMCC is Suspended from Belt, Neck or Garment, the Suspension Pad (FIG. 28-B-1) is resting against User's Body (FIG. 28-B-2), the Support Pad (FIG. 28-B-3) is held firmly by the Eastover Loop (FIG. 28-B-4), which is stretched enough not to slip away from Suspension Pad. Said Suspension Pad may have inward Dents (FIG. 28-B-5 & 6) for better Eastover Loop grip to Suspension Pad.

Thus the UMCC's working surface and keyboard (FIG. 28-B-7) is supported firmly at wide angle with User's body, but still visible for one hand operation, requiring no hand for operational support, hence the other hand is free to carry a briefcase, eat or drive. UMCC Screen module is held at viewing angle by proper conventional means or Hinges introduced here.

When not in use, Eastover Loop is manually forced to slide neat the anchor side of Suspension Pad. In folded up assembly, which may remain suspended from belt, neck or garment (FIG. 28-C), Support Pad, Suspension Pad are tucked on the underneath of UMCC body. Combination of Support Pad and Suspension Pad can be less than 2, even less than one mm thick and less than 20 even 10 grams, using light, stiff material such as FR4.

Palm/Wrist Strap for UMCC Hand Holding: FIG. 30-B introduces a UMCC Strap (FIG. 30-B-1), preferably Elastic not to be loose, preferably detachable, used to hold the UMCC on the palm or back of hands or wrist, while operated by the other hand.

FIG. 30-C shows one type of detached Strap, having a main Eastover Band (FIG. 30-C-1), rigid thin rods (FIG. 30-C-2 & 3), and two holes (FIG. 30-C-4 & 5) that can latch onto corresponding hooks on UMCC body (FIG. 30-B-2 & 3). Many other variations of Palm/Wrist Strap are possible.
Variations of Mechanical & Electro Mechanical Hinges One variation of the Rubber Mechanical Hinge in FIG. 13 is that the cross section of the Rod be Polygon from 2 sides as in FIG. 32-A-1. The Rubber Ring (FIG. 32-A-2 then conforms to its shape, holding it more firmly in either 0 or 180 degrees position then would a circular Rod, yet allows.

FIG. 32-B shows the cross section of an Electro Mechanical Hinge, analogous to the one in FIG. 14, but with a Polygonal (in this example triangular) (FIG. 32-B-1) cross section Rod (instead of circular). The diagonally stretched Rubber Ring (FIG. 32-B-2) presses the Element (FIG. 32-B-3) against the Rod, enabling passage of electrons. This enables a the Hinge to be more firmly stable at 0, 120 and 240 degrees than would a circular Rod, but unstable in other angles.

Equiside Polygonals from 2 to any number of sides are possible, but 3, 4, 5, 6, 8 sides should have more use. Rounding the Rod's corners (Fir.32-B-4) allows smoother pivoting of the Rod.

FIG. 32-C Shows a the cross section of a Mechanical Hinge, analogous to Rubber Mechanical Hinge of FIG. 13, but having Polygon cross section Rod (FIG. 32-C-1), inside a Polygon Ring (FIG. 32-C-2), made of Metal Spring, instead of Rubber Ring of FIG. 13. The Spring is tight for the Rod causing a Gap (FIG. 32-C-3).

FIG. 32-D shows the cross section of an Electro Mechanical Hinge, having a Circular cross section conductive Rod (FIG. 32-D-1), connected to Cathode (FIG. 32-D-2), tightly surrounded by a Metal Spring Ring (FIG. 32-D-3) connected to Anode (FIG. 32-D-4). This assembly allows flow of electricity from Anode to Cathode, at any angle between them. If Friction between Ring and Rod is suitably chosen, the Hinge can be stable at any desired angle.

Concepts of Polygonal instead of Circular Rod and Metal Spring Ring instead of Rubber Ring can be applied to the Electro Mechanical Pivot of FIG. 16 and to the Mechanical Hinges and Rubber Mechanical Hinges in Acute Electronic Hinges of FIG. 12, also for other uses in UMCC, plus general industrial use.

A thin rigid outer tube can be used to cover the Rubber Ring in Hinges introduced here for protection, aesthetic or other purposes.

Variations of UMCC Form and Size

One very good form of UMCC is the "Flip" UMCC shown in FIG. 29. UMCC main body module (FIG. 29-A-1) encompasses most parts, including an E-Pad, or one hand operated version of E-Board applicants patent pending pocket keyboard), hinged to a Screen module (FIG. 29-A-2). It can accommodate a better keyboard than typical cell phones and also a "landscape" Screen which is better for most uses than "portrait", especially for TV, Video, Game, Internet and many other uses.

Said Form is used in some conventional Smart Phones, but have at least there serious problems. First, conventional ones do not have a proper keyboard like E-Pad. We have separately explained the problems with conventional portable keyboards and advantages of E-Board. Ours has a proper E-Pad.

Second, they do not many of features we have introduced here, such as PVC.

Third, they are too wide, from left to right, to be held by one hand, for operation by other hand. They are desk dependent. Even dialing is difficult without a desk, as there is no handle to hold them. This application introduces ways of solving the holding problem.

Credit Card Size Flip UMCC: If such UMCC is roughly Credit Card Sized, when closed, even though thicker, holding it in hand will be much easier. This is not done conventionally (to applicant's knowledge), perhaps because the keyboard will be too tiny or perhaps no one thought of it. E-Board has a Credit Card Size version, called E-Card, that can be used.

Pocket Size Flip UMCC: Some 13×7 cm provides a good Screen and a good E-Pad, but is too large for hand span of most people. Our solution is One, better two Dents (FIG. 29-A-3 & 4) at the extreme(s) of the Hinge Strip, such that the closest distance between Dents is less than a typical span between top section of a typical thumb (FIG. 29-A-5) and middle finger (FIG. 29-A-6), used to hold such UMCC, while the pointing finger holds the back of the screen (FIG. 29-A-7) and other fingers hold the underneath of the UMCC body module (29-A-8 & 9). Thus the UMCC is held firmly in (say) left hand and typed on by right hand.

If a Double Hinge as in FIG. 29-B is used, the Screen and Main Body sized can be larger compared with Single Hinge version (FIG. 29-C), without increasing the folded up size of UMCC.

Hand Held Mini Notebook Flip UMCC: This version can be much larger than Pocket Size, say 16×9, yet fit in a large pocket. As shown in FIG. 30-A, this size allows a Standard character layout, one or two hand operable Keyboard or E-Board or Honeycomb E-Pad (with dipped bowl shaped keys). It also accommodates good sized screen, speakers, mouse pad and many other features not easily housed on smaller sizes.

This application introduces a solution for hand holding of such a Mini Notebook, by deeper Dents as in the Pocket Sized UMCC or better with two cavities (FIGS. 30-A-1 & 2), close enough for thumb and one of the middle fingers to grip it firmly, while other fingers are supporting the screen and UMCC body, as in the Pocket Size version.

Note: Above three UMCCs can also use Hands Free Carrying and Operational Support introduced.

The invention claimed is:

1. An electronic device selected from cell phones, smart phones, and hand held computers, having a working surface and a back surface separated from the working surface by device thickness when the working surface is in operating mode, said working surface has at least two pads hinged together along an axis, enabling said pads to fold over each other but unfold to expose said working surface for the operating mode, and said device has at least one finger hole cutting through said thickness, said axis colliding with each finger hole, each finger hole sized and shaped to receive a user's finger to ease gripping of the device, most of the perimeter of said at least one finger hole is surrounded by the body of said device such that in the operating mode a finger may only enter said at least one hole via the device back or working surface, and said at least two pads each comprise a portion of said at least one finger hole and the portions come together to define said at least one finger hole in the operating mode, where finger also includes thumb.

2. Claim 1 having at least two finger holes.

3. Claim 1 where at least one of said finger holes is sized to receive a thumb.

4. Claim 1 where at least one of said finger holes is sized to receive a non-thumb finger.

5. Claim 1 where said at least one finger hole is sized to receive a thumb and another finger hole is sized to receive a non-thumb finger.

6. Claim 1 where said operating surface span across said hinge is wider than the widest span between user's finger and thumb that grab onto the device's thickness to hold the device in the operating mode, where grabbing in the operating mode is enabled by placing at least one finger or thumb in said at least one finger hole.

* * * * *